United States Patent
Davis

(10) Patent No.: US 9,584,585 B2
(45) Date of Patent: *Feb. 28, 2017

(54) DRIVE WITH SERVER

(71) Applicant: Rockwell Automation Technologies, Inc., Mayfield Heights, OH (US)

(72) Inventor: Wayne R. Davis, Cambridge (CA)

(73) Assignee: Rockwell Automation Technologies, Inc, Mayfield Heights, OH (US)

( * ) Notice: Subject to any disclaimer, the term of this patent is extended or adjusted under 35 U.S.C. 154(b) by 598 days.

This patent is subject to a terminal disclaimer.

(21) Appl. No.: 14/043,106

(22) Filed: Oct. 1, 2013

(65) Prior Publication Data

US 2014/0091737 A1    Apr. 3, 2014

Related U.S. Application Data

(62) Division of application No. 11/329,625, filed on Jan. 11, 2006, now Pat. No. 8,554,877.

(Continued)

(51) Int. Cl.
*H02P 5/00* (2016.01)
*H02P 31/00* (2006.01)
(Continued)

(52) U.S. Cl.
CPC .......... *H04L 67/06* (2013.01); *G05B 19/4185* (2013.01); *H02P 5/00* (2013.01);
(Continued)

(58) Field of Classification Search
CPC . H04L 67/42; H02P 31/00; H02P 5/00; G05B 19/4185; G05B 2219/31457
See application file for complete search history.

(56) References Cited

U.S. PATENT DOCUMENTS

| | | | |
|---|---|---|---|
| 5,142,824 A | 9/1992 | Le Compagnon et al. | |
| 6,164,900 A | 12/2000 | Labell et al. | |

(Continued)

OTHER PUBLICATIONS

Ethernet Adapter Module, ACS 5000, ABB Switzerland Ltd., pp. 1-16, See p. 14; 2005.

(Continued)

*Primary Examiner* — Linglan Edwards
(74) *Attorney, Agent, or Firm* — Fletcher Yoder P.C.

(57) ABSTRACT

The present invention relates to a drive system that includes a module that operates as a server, where at least sometimes the module is at least one of directly integrated with another module that operates as a drive and fully integrated to include the drive. The server allows for communications with one or more terminals via an internet-type communications medium, while the drive is for controlling, monitoring and/or otherwise interacting with at least one motor, electromechanical machine, or other appropriate type of machine/process. In at least some embodiments, the server is capable of providing web pages, executable programs and/or other information including, for example, information in accordance with an FTP protocol onto the internet for receipt by the terminals. The terminals communicate commands and other information via the internet back to the server, which in turn can influence the drive and the controlled machine/process.

20 Claims, 10 Drawing Sheets

Related U.S. Application Data

(60) Provisional application No. 60/709,654, filed on Aug. 19, 2005.

(51) Int. Cl.
*H04L 29/08* (2006.01)
*G05B 19/418* (2006.01)
*H02P 29/02* (2016.01)

(52) U.S. Cl.
CPC ............ *H02P 29/021* (2013.01); *H02P 31/00* (2013.01); *G05B 2219/31186* (2013.01); *G05B 2219/31457* (2013.01); *Y02P 90/12* (2015.11); *Y02P 90/18* (2015.11)

(56) References Cited

U.S. PATENT DOCUMENTS

| | | | |
|---|---|---|---|
| 6,587,884 B1 | 7/2003 | Papadopoulos et al. | |
| 6,640,140 B1 | 10/2003 | Lindner et al. | |
| 6,757,568 B2 | 6/2004 | Birzer et al. | |
| 6,801,920 B1 | 10/2004 | Wischinski | |
| 6,819,960 B1 | 11/2004 | McKelvey | |
| 6,915,330 B2 | 7/2005 | Hardy et al. | |
| 7,103,642 B1* | 9/2006 | Chen | G06Q 10/00 709/218 |
| 7,134,118 B1 | 11/2006 | McNutt | |
| 7,233,830 B1* | 6/2007 | Callaghan | G05B 19/4188 700/17 |
| 7,299,099 B1 | 11/2007 | Divelbiss et al. | |
| 7,440,809 B2* | 10/2008 | Lehman | G05B 19/0428 700/180 |
| 7,530,113 B2* | 5/2009 | Braun | G05B 19/042 700/237 |
| 2002/0082720 A1 | 6/2002 | Birzer et al. | |
| 2002/0083847 A1 | 7/2002 | Schmitz et al. | |
| 2002/0129565 A1 | 9/2002 | Silberman et al. | |
| 2002/0156837 A1 | 10/2002 | Batke et al. | |
| 2003/0051074 A1 | 3/2003 | Edwards | |
| 2003/0067419 A1 | 4/2003 | Lambert | |
| 2003/0084112 A1 | 5/2003 | Curray et al. | |
| 2003/0109951 A1* | 6/2003 | Hsiung | G05B 15/02 700/108 |
| 2004/0007404 A1 | 1/2004 | Schmitz et al. | |
| 2004/0267395 A1 | 12/2004 | Discenzo et al. | |
| 2005/0021676 A1 | 1/2005 | Chambers | |
| 2005/0065913 A1 | 3/2005 | Lillie et al. | |
| 2006/0015195 A1 | 1/2006 | Lehman et al. | |
| 2006/0224250 A1* | 10/2006 | Callaghan | G05B 19/054 700/1 |
| 2007/0043457 A1 | 2/2007 | Davis | |
| 2009/0119437 A1 | 5/2009 | Hilscher | |

OTHER PUBLICATIONS

PF7000 GEN-32 Medium voltage Support Technical Services Update Modem Configuration on the PF7000 Drive, Issued by Rob Bickford, Apr. 2, 2003.

PowerFlex EtherNet/IP Adapter 20-COMM-E product information web page on archive.org dated Jun. 13, 2004, by Rockwell Automation.

\* cited by examiner

DRIVE WITH SERVER

CROSS-REFERENCE TO RELATED APPLICATIONS

This application is a divisional of U.S. patent application Ser. No. 11/329,625, filed on Jan. 11, 2006, which is a non-provisional application of U.S. Provisional Application No. 60/709,654, filed on Aug. 19, 2005, the full disclosures of which are each incorporated herein by reference.

STATEMENT REGARDING FEDERALLY SPONSORED RESEARCH OR DEVELOPMENT

Not applicable

FIELD OF THE INVENTION

The present invention relates to control devices and, more particularly, to drives employed to control operating characteristics of motors.

BACKGROUND OF THE INVENTION

Drives are control devices that are employed to control, monitor and/or otherwise interact with a variety of operational characteristics and parameters of motors such as, for example, motor speed, motor torque, motor power usage, etc. A wide variety of drives are available for use in conjunction with a wide variety of types of motors, including both alternating current (AC) motors such as synchronous motors and induction motors, and also direct current (DC) motors. Drives can also be used to control, monitor, or otherwise interact with a variety of other electromechanical machines such as generators and motor/generator hybrids (or even other types of machines and/or processes).

The control provided by drives includes the direct control over the power flow to the controlled motors or machines. Many drives are pulse width modulated (PWM) drives that rapidly turn on and off the flow of current (and the voltages) applied to the motors being controlled. In some circumstances, power that is effectively AC (including, for example, three-phase AC) can be provided to a motor simply by switching on and off DC sources with respect to the motor in an appropriate time-varying manner. Often, such PWM drives include a circuit board. with a controller (e.g., a computer, microprocessor or programmable logic device (PLD)) and an array of controllable power switching devices such as power transistors that are switched on and off by the control device.

Drives can be used to control motors of a variety of different power levels. A medium voltage AC drive, for example, generally is understood to be a drive used to control an AC motor requiring input voltages within the range of about 2400 to 7200 Volts AC. Exemplary medium voltage AC drives include, for example, the Allen-Bradley PowerFlex 7000 family of drives manufactured by Rockwell Automation, Inc. of Milwaukee, Wis., the beneficial assignee of the present application. In contrast, a low voltage AC drive typically would he used to control an AC motor requiring input voltages at lower levels (e.g., 480 Volts AC), while a high voltage AC drive would be used to control an AC motor requiring input voltages at higher levels (e.g., 10,000 Volts AC). Drives can likewise be configured for operation with other types of motors and other machines that are intended to operate at a variety of different power levels or require a variety of different power characteristics.

It is usually only possible for human beings (or other entities, e.g., computers) to interact with conventional drives in limited manners and/or within restricted environments. For example, in industrial environments, it is often only possible for human beings (e.g., technicians or other personnel who are operating or monitoring a manufacturing process) to control and/or monitor the operation of drives in an indirect manner by way of signals communicated via intermediate devices. Various different types of intermediate devices are possible. For example, the speed of a drive can be controlled by a speed potentiometer connected to an analog input of the drive and manually adjusted by the operator, while starting and stopping of the drive can be controlled through the use of hardwired pushbuttons for Start and Stop. Also, in some circumstances, specialized control terminals with specialized graphical user interfaces (GUIs) allow operators to access drives to which those control terminals are in communication.

Nevertheless, to the extent that drives are accessible by human beings (or other entities) by way of such intermediate devices, the manner of access is often constrained by the requirements of those intermediate devices. For example, in circumstances where access to drives is made possible by way of specialized control terminals with specialized GUIs, interaction via such control terminals/GUIs often requires the installation and use of special proprietary hardware and/or software at the locations of the operating personnel, for example, a PanelView 550 Monochrome Terminal available from Rockwell Automation equipped with appropriate firmware. Also, to the extent that such control terminals/GUIs require software (particularly firmware), such software often is only appropriate for use with a given terminal/GUI and is not transferable to other terminals/GUIs. This is the case even where a control terminal is capable of receiving information from a drive via a standardized type of connection such as an Ethernet connection.

Additionally, even where specialized control terminals/GUIs are employed in conjunction with drives to facilitate the accessing of the drives, such access is usually limited in terms of the rapidity with which desired information can be obtained from the drives and/or the rapidity with which commands or other information can be provided to the drives. The coupling of such control terminals/GUIs to drives typically involves the use of one or more intermediary hardware coupling components connected in between the terminals/GUIs and the drives. Also, the communication of signals between the control terminals/GUIs and the drives typically requires the addition and removal of protocol information in relation to the signals. Both the interposition of intermediary components and the addition/removal of protocol information slow down the rate at which information can be communicated between the control terminals/GUIs and the drives.

Further, because special proprietary hardware and/or software is typically required to allow persons to interact with drives by way of such control terminals/GUIs, and because such hardware and/or software is separate from (albeit directly or indirectly coupled to) the hardware and/or software implemented on the drives themselves, changes to aspects or features of the drives often necessitate changes in the hardware and/or software allowing accessing of the drives. If appropriate changes to the accessing hardware/software are not made, compatibility problems can result. Yet configuring/upgrading of the hardware and/or software (e.g., firmware) on a control terminal separate and/or remote from a drive often is burdensome and costly, as it typically requires a technician to visit the control terminal and install software onto and/or otherwise modify or reconfigure the control terminal. While configuring/upgrading of a drive typically necessitates configuring/upgrading of the control terminal, typically the configuring/upgrading of the two devices cannot be performed in a coordinated manner, e.g., simply by performing a single action or process or with a single package.

In addition to providing access to motor drives in the aforementioned manners, it is also known (particularly in industrial environments) to provide access to motor drives via programmable logic controllers (PLCs) that are in communication with the drives. In recent years, PLC devices having both PLCs and accompanying web servers (e.g., "web-enabled PLCs") have been developed allowing users to access, via the Internet, both the PLCs as well as devices coupled to the PLCs such as motor drives. However, the access to motor drives afforded by such web-enabled PLCs is disadvantageous for several reasons. First, while configuring/upgrading of a drive typically necessitates configuring/upgrading of software or other information on the web-enabled PLC, such configuring/upgrading of both devices typically cannot be performed in a coordinated manner, e.g., simply by performing a single action or process or with a single package.

Further, communication of any data between the drives and the web servers (and thus between drives and users on the Internet) is restricted by the processing/transmission efficiency of the PLCs themselves, which are situated between the web servers and the drives. Communication between the web servers and the drives also is restricted insofar as typically the signals sent to and received from the drives by the PLCs are communicated by way of any one of a number of proprietary intermediary devices including, for example, backplanes associated with the PLCs and various signal processing devices. The operation of such intermediary devices typically restricts the types of information that can be communicated, and considerably slows down the speed with which information can be communicated between the drives and PLCs, thus limiting the volume of information that can be transmitted effectively in a given time period. In some cases, communication adapters or converters are often coupled in between the PLCs and the drives, further restricting the types of information that can be communicated and reducing the speed of communication. For at least these reasons, web-enabled PLCs do not resolve the aforementioned problems associated with providing access to drives.

Although additional systems also exist that include web servers in association with other devices (e.g., other than PLCs), it is unclear whether such additional systems might be capable of providing improved access to drives. As in the case of web-enabled PLCs, a number of such systems employ web servers that are in communication with other devices by way of backplanes, backplane drivers and/or other intermediary devices. Consequently, communications between the web servers and other devices are typically delayed or restricted in various manners, such that any information to he communicated to and from those other devices by way of the web servers also tends to be delayed or restricted in various manners. Thus, as in the case of many of the other above-described systems, it would appear that it still would be difficult to configure or upgrade both a drive and associated web server in a coordinated, efficient manner.

Given the ubiquity of drives for controlling motors, other electromechanical machines and other machines in many environments including (but not limited to) industrial environments, and given the above-described limitations associated with controlling, monitoring and otherwise interacting with such drives as they are conventionally implemented, it would be desirable if an improved drive/drive system could be developed that would overcome one or more of these limitations. For example, it would be desirable if an improved drive system could be developed that in at least some embodiments provided enhanced access in terms of communication with other systems or entities (and/or operators or other personnel). More particularly, it would be desirable if an improved drive system in at least some such embodiments allowed for enhanced communication of commands and other information to and/or from the drive system, such that the speed of communicating information/commands to and from the drive system was not as significantly reduced due to the presence of intermediary hardware components and/or the addition/removal of communication protocol information as in conventional systems such as those discussed above.

Also for example, it would be desirable if an improved drive system could be developed that in at least some embodiments was accessible without the need for installing significant specially-designed or proprietary hardware (e.g., a specialized control terminal) or software at the location of the person or entity desiring access. Indeed, it would be further desirable if such an improved drive system could be developed that allowed access at multiple locations without the installation of different specially-configured hardware and/or software at those various locations. Additionally, it would be desirable if such an improved drive system could be developed that in at least some embodiments eliminated or reduced the possibility of incompatibilities arising between the drives and the access terminals/devices despite the upgrading or other modification of the drives, and alleviated sonic of the costs associated with configuring, upgrading or other modification of the drives.

BRIEF SUMMARY OF THE INVENTION

The present inventor has recognized that some or all of the above-described disadvantages associated with conventional drives can be alleviated by an improved drive system that includes a server (and appropriate software). In at least some embodiments, the server and drive are directly integrated with one another, either by placing the processing units of the server and drive in direct communication with one another, or by utilizing a single processing unit to govern both the server functionality and the drive functionality (so as to provide complete/full integration). By integrating the server and drive in such manners, there are no (or virtually no) delays or restrictions in communicating information antler commands between the server and drive, and large amounts of data can rapidly be transmitted between the server and the drive. Thus, the speed of access to the drive by way of external terminals in communication with the server is enhanced due to the server being fully integrated with the drive.

In at least some embodiments, by virtue of the server, such a directly integrated drive system can communicate with one or more user-accessible terminals located either proximate the drive system or remotely therefrom, via an internet or intranet-type connection/network (and, in at least some such embodiments, via the World Wide Web). Assuming that the server includes appropriate software and other information (e.g., including HTML code/applets), the software/information for generating a graphical user interface (GUI) on the terminals appropriate for enabling user access of the drive can he largely if not entirely stored within the server and then made available to the user-accessible terminals. With such a system, direct user access of the drive becomes possible without the use of specialized, proprietary software or hardware at the location(s) of the users, since conventional browser-equipped computers or other similar terminals will suffice as the user-accessible terminals.

Further, in at least some embodiments, compatibility issues between the drive and the user-accessible terminals that might otherwise arise due to updates or other modifications to the drive can be largely or entirely eliminated. That is, when updates or other modifications to the drive are made, all that is needed in terms of appropriately updating the manner of operation of the user-accessible terminals is the appropriate updating of the software/information at the server. Also, in at least some embodiments, to facilitate implementation of the improved drive system into industrial automation systems employing industrial control protocols and proprietary interfaces, the server is configured to communicate with the outside (including the provision of real time data) by way of Ethernet/IP protocols. Further, in at least some embodiments, the server has a FTP capability that further facilitates the transfer of large amounts of information. Additionally, in at least some embodiments, executable files can be transferred.

In at least some embodiments, the present invention relates to a drive system that includes a first module that operates as a server, where the first module is at least one of directly integrated with a second module that operates as a drive and fully integrated to include the drive.

Further, in at least some embodiments, the present invention relates to a drive system including a server, and a first drive, where the server and the drive are in communication with one another, and where the server is capable of communicating at least one web page onto an internet-type communications medium for receipt by an additional terminal. The server is further capable of communicating at least one executable program onto the internet-type communications medium.

Additionally, in at least some embodiments, the present invention relates to a method of communicating with a drive. The method includes providing a server that is at least one of directly integrated and fully integrated with the drive, sending a web page from the server onto an internet-type communications medium for receipt by a terminal, and receiving a communication arriving from the terminal at the server off of the internet-type communications medium.

Further, in at least sonic embodiments, the present invention relates to an add-on component for implementation in relation to a drive. The add-on component includes a module configured to be coupled to a port of the drive, where the module includes a server. When the module is coupled to the port, the server is directly integrated with the drive.

Additionally, in at least some embodiments, the present invention relates to a computer-readable medium embodying instructions for a processor to perform a method of communicating with a drive. The method includes sending a web page from the server onto an internet-type communications medium for receipt by a terminal, providing at least one of an executable program and information following a FTP protocol from the server onto the interact-type communications medium for receipt by the terminal, and receiving a communication arriving from the terminal at the server off of the internet-type communications medium.

DETAILED DESCRIPTION OF THE PREFERRED EMBODIMENT

Figure 1A:
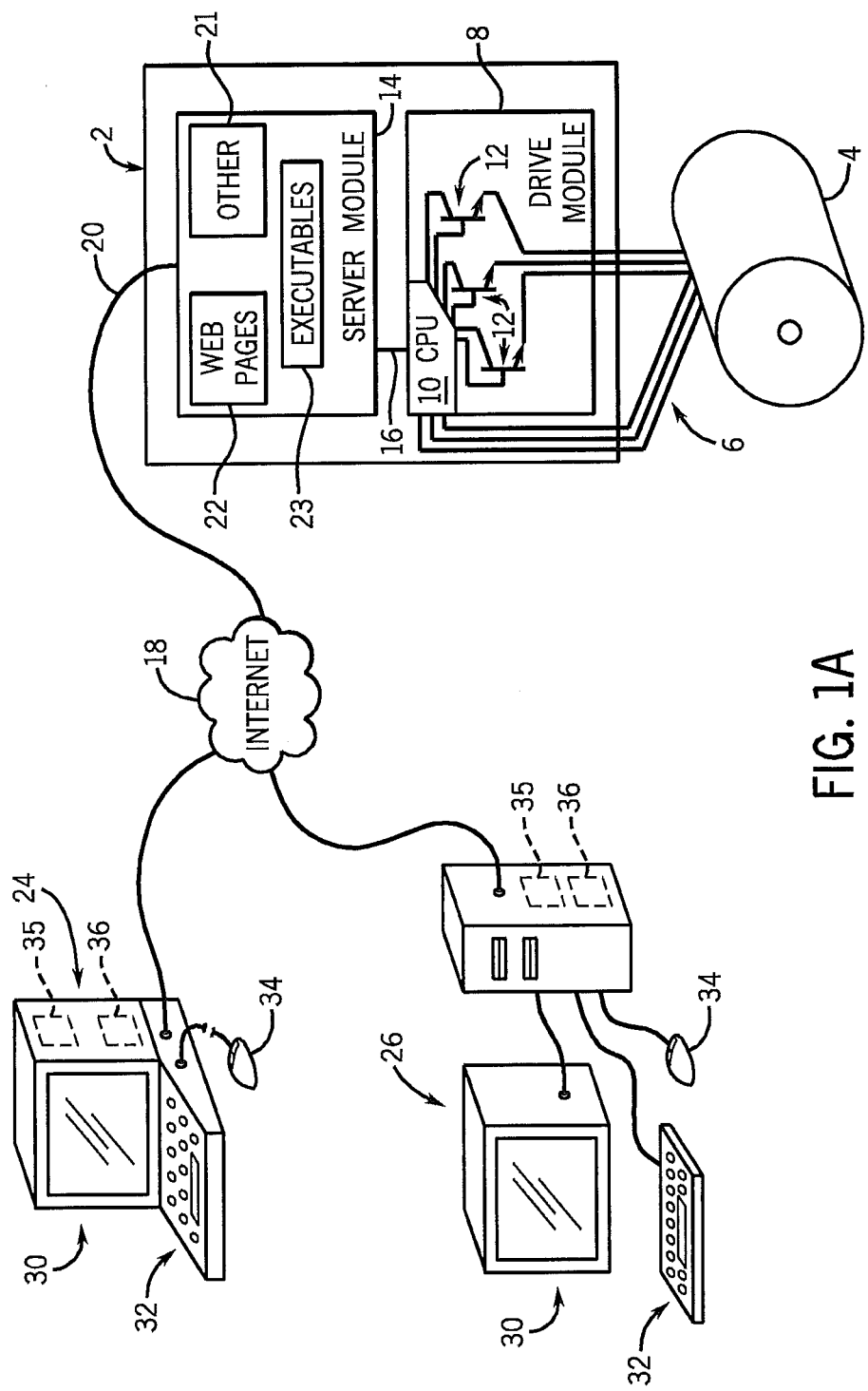
FIG. 1A shows in schematic form an improved drive system including a drive module and a server module that are directly integrated with one another and equipped for communication with a plurality of terminals via the interact, in accordance with one exemplary embodiment of the present invention.

Referring to FIG. 1A, an improved motor drive system 2 (or simply "drive") in accordance with one embodiment of the present invention is shown coupled to a motor 4 by way of various connections 6. The drive system 2 is capable of controlling the movement and other operation of the motor 4, including various operational parameters of the motor (e.g., torque, speed, power usage, etc.), and also is capable of monitoring the operation of the motor 4. In at least some embodiments, the drive system 2 is also capable of being configured in various manners, as well as capable of diagnosing characteristics or conditions of the motor 4. Also, in at least some embodiments, the drive system 2 is capable of taking actions in relation to its own operation including, for example, conducting self-diagnostics procedures.

The motor 4 in the present embodiment is a medium voltage three-phase AC synchronous motor (requiring voltages within the range of about 2400 to 7200 Volts AC). In alternate embodiments, the motor 4 could also be a high or low voltage AC motor or another type of motor, for example, an induction motor (of any voltage level), a DC motor, or a linear motor. Further, the motor 4 is also intended to be representative of other types of electromechanical machines such as generators or generator/motor hybrids, or even combinations of multiple motors and/or other machines, or processes. Indeed, the motor 4 is intended to be representative generally of any device(s) or process(es) that is/are capable of being controlled by the drive system 2, the other drive systems discussed below, or any other type of motor drive or similar system (e.g., a drive for another electromechanical machine).

To control the operation of the motor 4, the improved drive system 2 includes a drive module 8 that, as illustrated, includes a control unit (or "drive control") such as a central processing unit (CPU) 10. In the present embodiment, the drive system 2 is a pulse width modulated (PWM) drive system; in which the CPU 10 controls the operation of the motor 4 (at least in part) by rapidly switching on and off the currents/voltages applied to the motor. More particularly, the CPU 10 of the drive module 8 as shown governs the operation of the motor 4 by providing control signals to multiple power switching devices 12, which can be power transistors, for example. By appropriately turning on and off the power switching devices 12, effectively alternating current (AC) power can be provided to the motor 4, such that the motor can be driven as an AC motor.

In some embodiments of the present invention, the drive module 8 is a full-fledged drive system or drive that is capable of independent operation on its own (e.g., independently of the other portions of the drive system 2), for example, a PowerFlex 7000 MV AC drive available from Rockwell Automation, the beneficial assignee of the present application. In other embodiments, the drive meddle 8 can be something less than a complete drive system/drive that i capable of operating independently. Indeed, although the drive module 8 of FIG. 1A is shown as including both the control unit/drive control and the power switching devices, in other embodiments the drive module could be understood as including only the control unit/drive control, with the power switching devices being considered as constituting a separate module within the drive system.

Although the drive module 8 of FIG. 1A is shown to include three power switching devices 12, the drive module 8 is also intended to he representative of a variety of different drive modules that could have a variety of different numbers of power switching devices such as power transistors or other control devices that impact the power and/or the communications between the drive module 8 and the motor (or other machine) being controlled or monitored. Further, the drive module 8 is also intended to be representative of a variety of other motor drives/drive systems and modules (including complete drives capable of standing alone) that are configured for controlling a wide variety of types of motors and other electromechanical machines such as those mentioned above. Indeed, depending upon the embodiment, the drive module 8 can be any of a variety of other types of conventional motor drives or similar systems including, for example, Direct-to-Drive™ transformerless drives available also available from Rockwell Automation.

Further as shown in FIG. 1A, the improved drive system 2 includes not only the drive module 8 but also includes a server module 14. As discussed below in further detail with respect to FIG. 1B, which shows exemplary internal components of the server module 14, the server module is directly integrated with the drive module 8 insofar as it is in direct communication with the drive module 8 by way of one or more internal communication link(s) 16. Additionally, the server module 14 is in communication with the Internet 18 by way of an additional communication link 20, which in the present embodiment is an Ethernet link. In the present embodiment, the Internet 18 is also representative of the World Wide Web (or "WWW"), but is not limited to the WWW. For example, it is also intended that the Internet 18 be representative of a point-to-point link between a drive system and an external device (e.g., a client/terminal as discussed below).

The server module 14 stores a variety of information. In particular, the server module 14 stores a website with one or more web pages 22, which can be in the form of HTML (hypertext markup language) code as weld as include applets (e.g., JAVA applets). Often, the web pages contain text as well as possibly graphical images and/or hypertext links to other web pages, which can be stored internally within the server module 14 and/or at external sites. Additionally, in at least some embodiments, the server module 14 stores executable programs 23. Such executable programs can include executable binaries, for example, .NET or Microsoft Foundation Class (MFC) based programs, which can utilize the .NET framework and/or the .NET Compact Framework available from Microsoft Corporation of Redmond Wash. Also, the server module 14 is capable of storing and processing other information 21 including, for example, data regarding performance of the server module, the drive module 8, the overall drive system 2, the motor 4, or other data. In at least some embodiments, as discussed in further detail below, the server module 14 is configured to allow for communication of such data via the file transfer protocol (FTP).

The web pages 22, executable programs 23 (or components of such programs), and/or other information 21 stored and/or processed at the server module 14 can be provided via the Internet 18 to one or more terminals or web clients, which are shown in FIG. 1A as including a first terminal 24 and second terminal 26. Each of the terminals 24, 26 can he any standard computer device such as a personal or full-sized computer or possibly a resource restricted device (e.g., a thin client or CE terminal) that is equipped with a standard browser program such as Internet Explorer™, also available from the Microsoft Corporation. In the embodiment shown, each of the terminals 24, 26 includes a respective monitor 30 (which can be color or monochrome), keyboard 32, and mouse 34, as well as a processing unit 35 and at least some memory 36, although the exact components of the terminals can vary depending upon the embodiment (for example, a terminal need not include a mouse, or the keyboard could be replaced with a touch screen).

By virtue of their respective browser programs, the terminals 24, 26 can communicate with the server module 14 via the Internet 18 (and the additional communication link 20) and access the website so as to download the web pages (including applets) 22, as well as the executable programs 23 and other information 21. Further, in some embodiments, other programs or tools on the terminals 24, 26 also can be employed in addition to (or instead of) browser programs to download information such as the information 21, e.g., programs allowing for information to be transferred to the terminals via FTP. As discussed further with respect to FIGS. 3-9, through the use of the respective browser programs and/or other programs/tools, and through the use of the web pages, executables and other downloaded information, each of the terminals 24, 26 can be utilized by a user (e.g., an operator, technician or other human being or even possibly some other entity, such as a computer) to control, monitor and/or otherwise interact with the improved drive system 2. As a result, such users are further able to control, monitor and/or otherwise interact with the operation of the motor 4 or such other machine(s) as are controlled and/or monitored by the drive system 2. This is true, regardless of whether the terminals 24, 26 or any associated users are physically located remotely from, or proximate to, the drive system 2.

More specifically, to access the website hosted by the server module 14, a user at one of the terminals 24,26 types a Uniform Resource Locator (URL) address, which in turn causes a connection to be established between the terminal and the server module 14 and causes the retrieval of one or more files (possibly in the form of web pages) 22 from the server module. In the present embodiment, the browser program employed by the terminals 24,26 includes a Java virtual machine (VM) in order to execute Java applets and classes. Embedded within the HTML code of a web page typically are one or more references to one or more Java classes. The browser requests such a Java class from the server module 14 and executes the returned code, so as to transform the generic browser-equipped terminal 24 or 26 into a terminal that is appropriate for use m interacting with the drive system 2. As various interface objects (for example, tabs, buttons, fields as discussed below with reference to FIGS. 4-8) are selected via the browser program, additional Java classes are retrieved from the server module 14 in similar fashion. Although in the present embodiment a Java VM is employed, in alternate embodiments other virtual machines or programming techniques (e.g., .NET) can be employed.

In the embodiment of FIG. 1A, the Internet 18 is intended to be representative done or more networks that are in communication by way of the TCP/IP protocol, albeit the Internet should also be understood to encompass one or more networks that are in communication by way of other protocols that currently exist or may be developed in the future that are similar to the TCP/IP protocol or provide similar functionality. The communication link 20 is an Ethernet connection such that the improved drive system 2 can be easily integrated with existing networks that are in place in office environments or other commercial environments, as well us with evolving manufacturing or plant floor networks, among others. The Internet 18 and communication link 20 can be formed from any of a variety of different types of hardware communication links, cables, wireless communication components (e.g., transponders, receivers, etc.), and other communications devices. The terminals 24 and 26 can be located in close proximity to the improved drive system 2 or otherwise be remotely located away from the improved drive system, even possibly hundreds or thousands of miles away from the drive system (or, one of the terminals could be proximate to the drive system while another was far away).

While FIG. 1A shows the Internet 18 to be linking the terminals 24, 26 with the improved drive system 2, the present invention is also intended to encompass alternate embodiments in which one or more terminals are in contact with the improved drive system 2 (or a similar system) by way of other internet-like networks such as an intranet within a single building or company, or other networks including, for example, networks only local to a group of drives, or a point to point Ethernet connection between a drive and a terminal/personal computer. In at least some of the embodiments encompassed by the present invention, the terminals 24, 26 are in communication with the improved drive system 2 via the World Wide Web (WWW) and, in such embodiments, the server module 14 can be a web server module operating as a web server. Nevertheless, the present invention is intended to encompass systems in which a server is in communication with one or more other terminals by way of any of a variety of different Internet-based and even non-Internet-based communications media.

Also, the particular physical devices and protocols utilized for communications between the terminal(s) and the drive system 2 corresponding to the seven layers of the OSI model can vary depending upon the embodiment. In the present embodiment, to provide real-time data from the drive system 2/server module 14, one or more of the Java classes provided to the terminals 24, 26 are able to make requests to the server module 14 using the Ethernet/IP (Ethernet/industrial protocol) adaptation of CIP (as is used by DeviceNet or ControlNet). This includes the stack layers of Ethernet (Physical and Datalink), IP, TCP, and CIP Encapsulation. Two additional protocols are also employed, which are embedded within the CIP layer, PCCC and DPI. It is information in the DPI protocol that the drive system 2 ultimately understands and will respond to for the purposes of delivering real time data.

Notwithstanding the above description, in alternate embodiments a variety of other physical devices and protocols can be employed corresponding to the different layers of the OSI model. For example, in some embodiments, the communication link 20 could (instead of having an Ethernet-type physical layer) have a physical layer that is CAN-based, or otherwise different from an Ethernet-type physical layer. In still additional embodiments, one or more serial connections (e.g., RS232-based connections or connections employing 20-COMM-E modules available from Rockwell Automation) can also be utilized as the communication link 20 (and/or in place of the Internet 18 as shown in FIG. 1A). Further for example, the data link layer could, instead of being an Ethernet-type protocol, be another protocol, such as a PPP/SLIP protocol.

Also for example, with respect to the network layer, while the interact protocol (IP) is typically utilized, other protocols could also be employed (e.g., IPX). Additionally for example, with respect to the transport layer, typically the TCP protocol is utilized but, in some alternate embodiments, other protocols such as the UDP protocol or the DPI/ScanPort protocol could also be used. Further for example, with respect to the application layer, any of HTTP, FTP, Telenet, SNMP, NFS or a variety of other protocols can be used instead of CIP or Ethernet/IP. In at least some embodiments, in terms of firmware, the interact protocol stacks are required to provide standard message passing via an Ethernet connection. Ideally, these are available as a library so that resources are not required for coding and testing. Through the use of a library, firmware efforts are directed at providing application support unique to the drive (as well as any unique protocols, e.g., protocols unique to the automation industry where the drives are being used in an automation environment).

In at least some embodiments, the server module 14 also facilitates the efficient transferal of files between the drive module 8 and the terminals 24, 26, typically using FTP. In this manner, the terminals 24, 26 are able to obtain various information concerning operation of the drive module 8 and/or the motor 4 including, for example, reports, configuration data, diagnostics data, and instructional data from the drive module. Also, typically by way of FTP, it is possible for new firmware components or configuration data to be loaded into the drive system 2 by way of FTP. Further, the terminals 24, 26 are able to gain real time access to various operational, diagnostics or other data regarding the drive module 8 and/or the motor 4 using the Ethernet/IP (Ethernet/industrial protocol).

In view of the above discussion, in at least some embodiments, the server 14 can be understood as including more than one server, or multiple "sub-servers". For example, the server 14 can include a first sub-server dial is a web server or HTTP server, a second sub-server that is a FTP server, and a third sub-server that is an Ethernet/IP server. Other versions of the server 14 can include any one or more of these (and/or other) server capabilities. Again for example, in some embodiments, the server 14 would only include the FTP server capability but not the Ethernet/IP capability or web/HTTP capability. In further embodiments, the server 14 can include other sub-server(s) having other server capabilities in addition to, or instead of, server capabilities relating specifically to the aforementioned server capabilities relating to the communication of web/HTTP, FTP, and Ethernet/IP-type data.

By employing a server or similar device on the improved drive system 2 as shown in FIG. 1A, one or more terminals can easily access the drive system for the purpose of controlling, monitoring and/or otherwise interacting with the motor(s) or other machine(s) such as the motor 4 without tho use of any special technology at the terminals themselves. That is, each of the access terminals can achieve access with respect to the drive system simply through the use of a conventional browser program, and all specialized aspects relating to the interface are provided by way of the server (or similar device). Given this configuration, compatibility problems generally do not arise between the drive system and the access terminals. Whenever changes are made to the drive system, corresponding changes are made to the web pages or other information that is stored in the drive system, utilized by the server and provided to the terminals, and these changes to the web pages or other information typically are sufficient to allow appropriate operation of the access terminals.

Figure 1B:
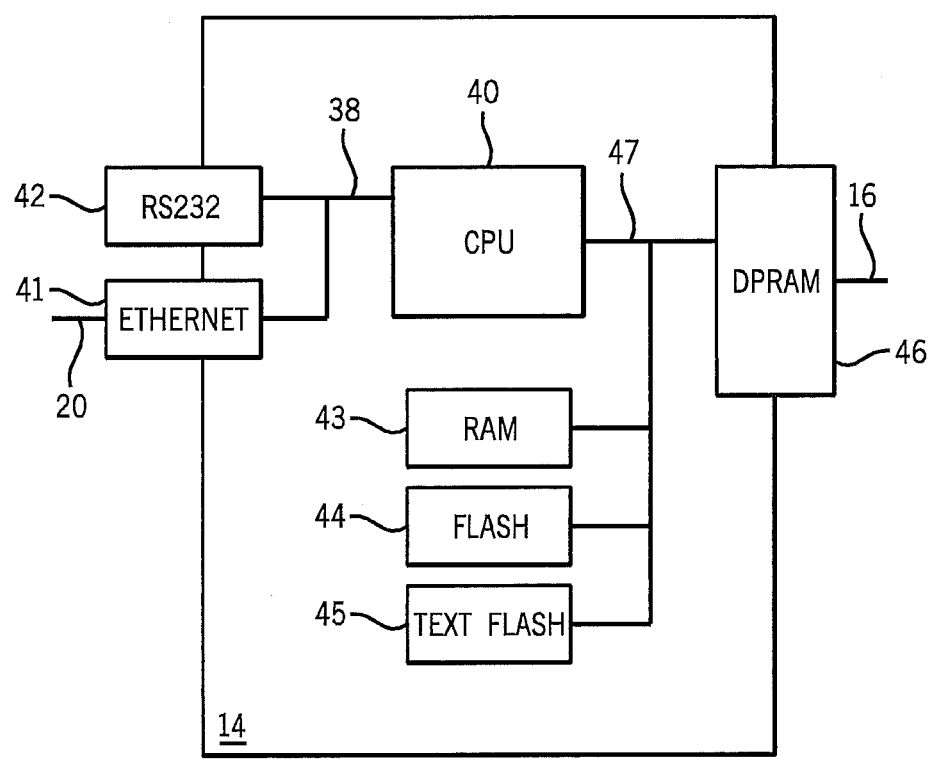
FIG. 1B is as block diagram showing several exemplary components of the drive system of FIG. 1A that enable the drive system to communicate with the terminals via the internet.

Turning to FIG. 1B, the server module 14 in the present embodiment includes several components. In particular, the server module 14 includes a central control unit or central processing unit (CPU) 40. Although the CPU 40 can take a variety of forms depending upon the embodiment (or, can be replaced with other controllers or control componentry), in at least some embodiments the CPU 40 can be from the x86 family of processors available from Intel Corporation of Santa Clara, Calif., or in at least some other embodiments the CPU 40 can be a ColdFire CPU available from Freescale Semiconductor, Inc, of Austin, Tex. Further as shown, in the present embodiment the CPU 40 is coupled to an Ethernet port 41, by which the CPU 40 is able to communicate with the Ethernet communication link 20. Also, the CPU 40 is coupled to a RS232 communication port 42. The CPU 40 is coupled to each of the Ethernet port 41 and the RS232 port 42 by one or more internal communication links or busses 38.

In the present embodiment employing the Ethernet communication link 20, the RS232 port 42 is a redundant communications port that is not utilized. However, in alternate embodiments, it can be used in addition to or instead of the Ethernet port 41 to achieve communications between the server module 14 and external devices such as clients/terminals as discussed above. In particular, the RS232 port 42 can he utilized to achieve point-to-point serial connections with terminals where an Ethernet network is not available or required. In such embodiments, the protocols associated with the upper levels of the OSI model would still be used, but the protocols/structures associated with the lower levels (e.g., physical layer, data link layer, network layer and transport layer) would be different and appropriate for the RS232 connection. Although FIG. 1B shows the server module 14 as including both the Ethernet port 41 and the RS232 port 42, in further embodiments, the server module 14 could be designed to have only the Ethernet port 41 (or even only the RS232 port 42) rather than both ports, or could have some other type of port in addition to or instead of such ports. For example, in some embodiments, the server module 14 could be employed in a 20-COMM-E module.

The CPU 40 is additionally coupled to a plurality of memory devices including a random access memory (RAM) device 43, a flash memory device 44, and a dual port random access memory (DPRAM) 46. The CPU 40 is coupled to each of the memory devices 43-46 by way of one or more additional internal communication links or internal buses 47. In contrast to the other memory devices 43-45, the DPRAM 46 in particular is capable of being in communication not only with the communication links 47 but also with the internal communication link(s) 16 discussed above with respect to FIG. 1. Thus, the DPRAM 46 serves to link the CPU 10 of the drive module 8 with the CPU 40 of the server module 14, and more particularly allows for shared memory between the two CPUs, such that the two CPUs are in communication with one another. The various memory devices 43-46 are capable of storing any of the web pages 22, executables 23, or other information 21 mentioned above. Alternatively, some or all of this information can be stored at other locations, including locations remote from (but capable of being accessed by) the server module 14.

In terms of the physical structure of the server module 14, in at least some embodiments the server module is formed by way of a plug-in card such as a Personal Computer Memory Card International Association (PCMCIA) card (which can be an approximately 3.5 inch by 2 inch card) that plugs into a port existing on the drive module 8. Plugging-in of the card into the port allows for coupling of the DPRAM 46 to the communication link(s) 16 of the drive module 8. Use of such a card allows the drive system 2 to implemented in a modular manner. Consequently, Internet connectivity can be viewed as an option but not a necessity (e.g., the server can be added to a drive at a later date). Also, the use of such a card allows the drive system to be more easily adapted to newer or different server platforms in the future if required. Such adaptability could be advantageous in a variety of scenarios including, for example, where a choice of third party CPU core has become obsolete, where storage memory or processing power requirements change or increase, etc.

In other embodiments, the server module 14 need not be implemented on a plug-in card, but rather can take on a more conventional physical structure such as a circuit board mounted within a housing for the drive system 2, e.g., the same housing in which is housed the drive module 8. Also, in some embodiments, the server module 14 and drive module 8 could be implemented on the same microchip. In all (or at least most) embodiments, regardless of whether the server module 14 is implemented in the form of a modular card or otherwise, the server module 14 should be coupled in very close proximity to the CPU 10 of the drive module 8 (e.g., a few inches, for example, less than four inches) to avoid engendering speed and noise issues.

The improved drive system 2 of FIGS. 1A and 1B is an embodiment in which the drive system includes two distinct modules each having distinct functions. The drive module 8 is dedicated to or primarily focused upon controlling and monitoring the motor 4. The server module 14 is dedicated to or primarily focused upon enabling/facilitating communications between the drive module and one or more terminals 24, 26 via the Internet 18 and, more particularly, providing the web pages 22, executable programs 23 and other information 21 to those terminals so as to allow access to the improved drive system by way of those terminals, and thereby allow those terminals to control, monitor and otherwise interact with the drive system and with the motor 4.

Notwithstanding the different functional responsibilities of the drive module 8 and the server module 14 of the drive system 2, in the present embodiment the to modules are directly integrated with one another (that is, the two modules are in intimate association or embedded with one another) since the respective CPUs 10, 40 of the two module 8, 14 are directly coupled to one another by way of the DPRAM 46 (and the communication link(s) 16, 47). The DPRAM 46, unlike many other possible intermediary devices, allows for nearly seamless, perfectly transparent communications between the CPUs 10, 40, almost as if the CPUs 10, 40 shared the same memory bus. More particularly, the DPRAM 46 does not add or remove, or necessitate the addition or removal of, any protocol information (including, for example, checksum information) with respect to any of the signals provided on the communication links 16, 47. Nor does the DPRAM restrict the communication of information in any manner. As a consequence, data can be passed back and forth between the CPUs 10, 40 in an effectively delay-free, uninterrupted, and unrestricted Manner, and very large amounts of data can be efficiently passed back and forth between the CPUs, in a real time manner if necessary. Further as a result; the CPUs 10, 40, and the drive module 8 and server module 14 of which those CPUs form a part, can be viewed as operating as almost a single module.

Because of the direct integration of the drive module 8 and server module 14 via the DPRAM 46, communications are facilitated not only between those two modules but also between the drive system 2 and the external terminals 24, 26 that are coupled to the drive system by way of the Internet 18. In particular, because data at the drive module 8 can be immediately and efficiently communicated from the drive module to the server module 14, such data (or derivative data as generated by the server module based thereupon) can be more rapidly and efficiently communicated to the terminals 24, 26. Likewise, commands and other data transmitted from the terminals 24, 26 to the server module (and other derivative commands and data generated by the server module based thereupon) can be more rapidly and efficiently transmitted to the drive module 8. Messages communicated from the terminals 24, 26 are directed toward the directly integrated server module and drive module, rather than toward some other location remote or only loosely connected with the drive module.

Although the improved drive system 2 of FIG. 1B employs the DPRAM 46 to link the CPUs 10, 40 of the drive module 8 and server module 14, in alternate embodiments, the CPUs 10, 40 (or the communication link(s) 16, 47 coupled to those CPUs) could be directly connected with one another in other ways. For example, in certain alternate embodiments, the CPUs 10, 40 could completely share the same memory bus or other hardware bus, e.g., the communication link(s) 16 and communication link(s) 47 could be one and the same. Also for example, in certain alternate embodiments, another device comparable to the DPRAM 46 in terms of allowing immediate, unrestricted, efficient, "tightly-coupled" communications between the CPUs 10, 40 (e.g., between the communication links 16, 47) could be employed, for example, some type of communications medium allowing for either high speed serial or parallel communications. Further, in some alternate embodiments, one or more of the CPUs 10, 40 can be replaced or substituted with other types of controllers, processing or control devices including, for example, microprocessors, programmable logic devices (e.g., field programmable gate arrays), and other devices.

Figure 2A:
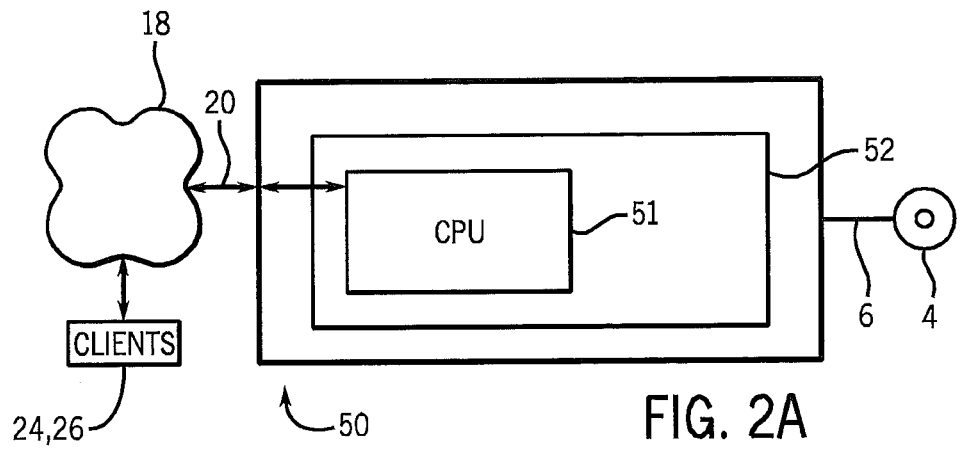
FIGS. 2A-2C show in schematic form several alternate embodiments of drive systems in accordance with various embodiments of the present invention.

While FIGS. 1A and 1B show the improved drive system 2 as including two distinct modules with two distinct CPUs 10, 40, in alternate embodiments the drive system can take other forms. Referring to FIG. 2A, in one such alternate embodiment, the drive module 8 and server module 14 are unified to form a drive system 50 having only a single module 52, where the single module has only a single CPU 51. In alternate embodiments, another type of processing or control device can take the plate of the single CPU 51 such as, for example, a field programmable gate array as mentioned above. In embodiments represented by FIG. 2A, the single module 52 is capable of controlling, monitoring and/or otherwise interacting the motor 4, by controlling the power transistors or other power switching devices that govern the current/voltage applied to the motor. The single module 52, including the CPU 51, physically is formed on a circuit board and forms (either alone or in combination with additional drive control circuitry) a drive control that in turn controls the power transistors or other power switching devices, which would not be located on that circuit board (e.g., those switching devices are part of the drive system 50 but not part of the single module 52). In addition to controlling the power transistors or other power switching devices, the single module 52 also is capable of operating as a server that enables/facilitates the accessing of information by the terminals 24, 26 connected to the drive system 50 by way of the Internet 18 or similar networks (or other communication linkages).

The embodiment of FIG. 2A in which the drive and server characteristics of the drive system/module are not only directly integrated but are fully integrated, insofar as a single control or processing unit manages both the drive type functionality and the server type functionality (e.g., where the server is resident as part of the drive module). This embodiment is superior to the embodiment described with reference to FIGS. 1A and 1B to the extent that this embodiment has absolutely no communications delays or restrictions imposed by any intermediate device such as the DPRAM 46, and farther has complete integration of the execution of operations relating to drive type functionality and server type functionality. At the same time, this embodiment may be less preferred to that of FIGS. 1A and 1B to the extent that the latter embodiment may he easier to implement and also allows for the server functionality to he added as an option (e.g., by plugging in a server module card such as the above-mentioned PCMCIA card into an existing drive module).

While FIG. 2A in contrast FIG. 1B shows an embodiment in which only a sing CPU (or other control device) is employed, in further alternate embodiments the functions and responsibilities relating to motor control and monitoring, processing of information (including any analysis and determinations of control signals) and communications with the outside world (e.g., server operations) can be allocated and/or divided among more than two modules, controllers or processors or in other manners than those described above. Nevertheless, although the particular allocation of functions and responsibilities to one or more modules (and CPUs) can vary depending upon the embodiment, it should be added that an important consideration in the design of embodiments of the present invention employing more than one module/CPU is that the module/CPU (or other control device) responsible for server functionality be directly integrated with the module(s)/CPU(s) (or other control device(s)) responsible for motor control/monitoring functionality.

Through the use of such directly-integrated designs, communication between the various (e.g., server and drive) modules can occur without significant delays or interruptions that might otherwise occur due to the use of such intermediary devices or the addition/removal of protocol information. Consequently, the server is able to operate in nearly constant, uninterrupted, and instantaneous communication with the drive control (or drive module), such that large amounts of monitored information regarding performance of the drive control (or the entire drive system) can be rapidly and continuously provided to the server, and such that commands and other information provided by the server to the drive control (or drive module) are supplied in a rapid, continuous meaner as well. Further, while delays may still occur between the server and any terminals that are in communication with the server by way of the Internet or other communication linkages, communication delays or interruptions arising from the manner of communication between the server and the drive control (or drive module) controller are largely (if not entirely) eliminated.

Figure 2B:
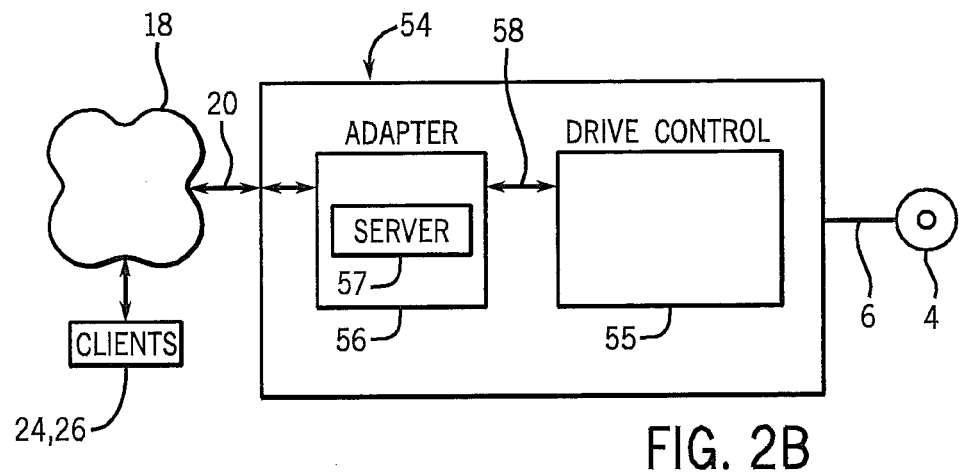

Although the above-described embodiments of the present invention are embodiments in which a drive module and server module (or multiple such modules) are directly integrated or (in the embodiment of FIG. 2A) even fully integrated with one another, the present invention is also intended to encompass, in less preferred forms, other drive systems in which a drive module (having one or more CPUs) is associated with a server module in an indirect manner. For example, FIG. 2B shows one such alternate embodiment in which a drive system 54 is formed from the combination of a drive module (or drive control) 55 and an adapter 56, where a server 57 is fully integrated with the adapter. More particularly, the adapter 56 serves to convert a physical Ethernet connection and associated protocols into another hardware medium and protocol(s) that are more tightly controlled or are proprietary to the drive module 55 (or other drive control hardware), and vice-versa.

In such embodiment, the Ethernet connection and associated protocols are used to communicate onto the communication link 20 and thereby with the terminals 24, 26 via the Internet 18, while the other hardware medium/protocol(s) are used to communicate with the drive module 55 by way of a communication link 58, which also may be tightly controlled or proprietary. From the perspective of the drive module 55, the adapter 56 is external, although physically the adapter could be situated along with the drive module within a shared housing or enclosure.

One example of an adapter 56 with respect to which the server 57 could he integrated is the above-mentioned 20-COMM-E module available from Rockwell Automation. This module is capable of converting an Ethernet signal into a physical CAN (Controller Area Network) signal, and vice-versa. The protocol used on the CAN side is the DPI (Drive Peripheral Interface) protocol, also available from Rockwell Automation, while the protocol used on the Ethernet side can be (as described above) the Ethernet/IP protocol built on top of the standard TCP/IP protocols used for transporting messages over the Ethernet link.

The 20-COMM-E module particularly suited for operation as the adapter 56 in conjunction with the Internet 18 on several counts. First, a 20-COMM-E module includes multiple HTML pages that can be used to gather information about the 20-COMM-E module (e.g., about the adapter 56) and to configure its operation (albeit not the configuration of any associated drive module). The 20-COMM-E module also has the capability of sending email messages (if appropriately configured) when a fault occurs in the associated drive module 55. However, while a 20-COMM-E module can serve as the adapter 56 between the Ethernet communication link 20 and the CAN-DPI communication link 58, the module has several limitations in this regard. First, information being passed over the CAN-DPI communication link 58 to the drive module 55 from the adapter 56 is limited to that defined by the DPI Protocol. Also, while the adapter 56 is capable of providing real-time control feedback and drive configuration data via a physical Ethernet connection, the adapter is not capable of serving web pages from the drive or providing FTP services for the files in the drive.

Another example of the adapter 56 other than a 20-COMM-E module would simply he a dedicated server that, instead of being directly or fully integrated with the drive module (as in the case of FIGS. 1A, 1B and 2A), rather is only indirectly integrated with the drive module 55. Such indirect integration would occur by way of one or more communication links existing between the server (corresponding to the communication link 58 shown in FIG. 2B), where the communication links were, for example, a RS232-type link, ControlNet type link, a DeviceNet-type link, a USB-type link or some other communication link (particularly a proprietary communication link). In such ease, the server/adapter 56 is capable of using the communication link 58 to gather information from the drive module 55 so that it can be served via the server 57 onto the Internet 18 for receipt by the terminals 24, 26. The exact communication link 58 will depend on the available communications established on the drive module 55.

Figure 2C:
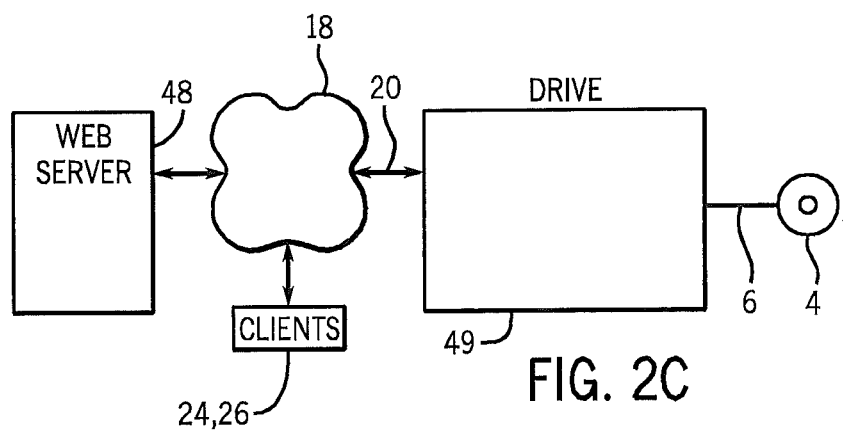

Referring to FIG. 2C, least preferred embodiments of the invention involve a server 48 that is external to a drive system 49 and that is coupled both to the drive module and to the clients/terminals 24, 26 via the Internet 18 and, more specifically, by way of an Ethernet-type connection. The server 48 can exist on a personal computer, as a dedicated server, or as a specialized module that plugs into a programmable logic controller or other device. Also while the server 48 can be local (e.g., physically proximate) to the drive module 49, it also can be located far away (e.g., miles away) from the drive module. While this type of arrangement allows the provision of some server functionality in relation to a drive, it is not preferred since the server does not have immediate, unrestricted access to the 'internals' of the drive (nor even relatively enhanced access that might be afforded through the use of proprietary networks or hardware as with possibly the embodiments of FIG. 2B).

Although FIGS. 1A-2C show a variety of embodiments of the present invention, it will be understood that these embodiments are only intended to be exemplary and that numerous variations of these embodiments are also intended to be encompassed by the present invention. For example, while the embodiment of FIGS. 1A-1B includes only the single drive module 8 and the single server module 14, the present invention is also intended to encompass embodiments in which a single server module was in communication with (and directly integrated with) multiple drive modules. Likewise, the present invention is also intended to encompass embodiments in which a single drive module was in communication with multiple server modules, or where multiple drive modules are in communication with multiple server modules. Also, the present invention is intended to encompass embodiments corresponding to that of FIG. 2B except insofar as multiple adapters are used (and where a server is positioned on only one of those adapters). Further, the present invention is intended to encompass embodiments in which the relationship (and degree of integration) of a server and drive module varies with time and/or can be switched depending upon the circumstance.

Turning to FIGS. 3-8, exemplary pages, forms and dialogs that can be displayed by a running program, and that can be accessed and downloaded by browser-equipped terminals such as the terminals 24, 26 from a server such as that of the server module 14 discussed above, are shown. The forms/dialogs/pages shown in FIGS. 3-8 can be generally understood as constituting "web pages" (and can be written using HTML) or at least as items that can be implemented as web pages, and are referred to as web pages below. The web pages can include test, pictures, animations, Java applets, and links (hyperlinks), among other features. Upon receipt at the browser-equipped terminals 24, 26, the web pages can be displayed on the monitors 30 of those terminals.

More specifically, the forms/dialogs/pages shown in FIGS. 3-8 in the present embodiment are programmed using the Java language available from Sun Corporation of Santa Clara, Calif. The Java program typically is launched by a Java applet, which typically includes many Java classes that are downloaded from the server module 14 and run within the browser environment. In other embodiments, forms/dialogs/pages having a similar look, feel and operation can likewise be provided using the .NET Framework environment available from Microsoft Corporation. In such case the "program" is launched from within the browser environment.

Figure 3:
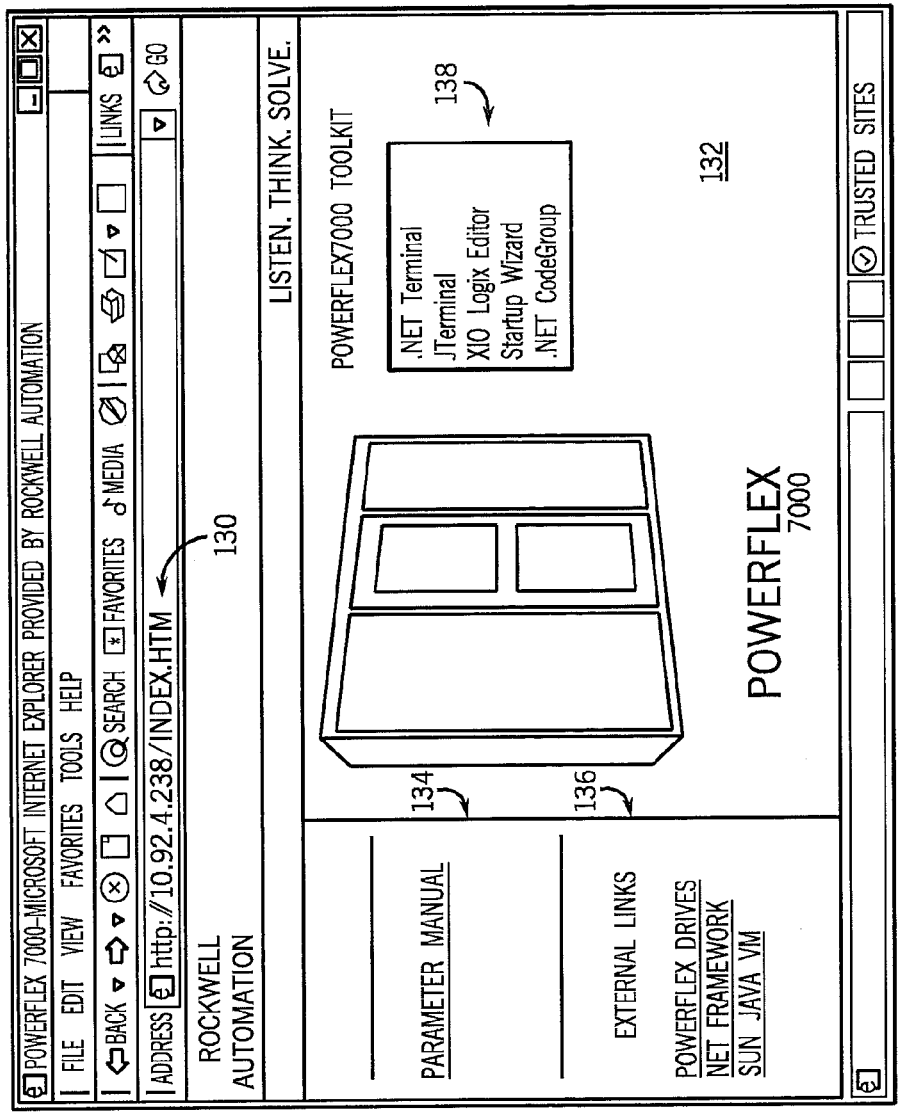
FIGS. 3-9 show exemplary screen images that can be displayed on one or more of the terminals of FIGS. 1A and 2A-2C as part of a graphical user interface (GUI), where the images depend at least in part upon information communicated via the internet between the terminal(s) and a drive system such as those described with reference to FIGS. 1A-1B and 2A-2C.
Figure 4:
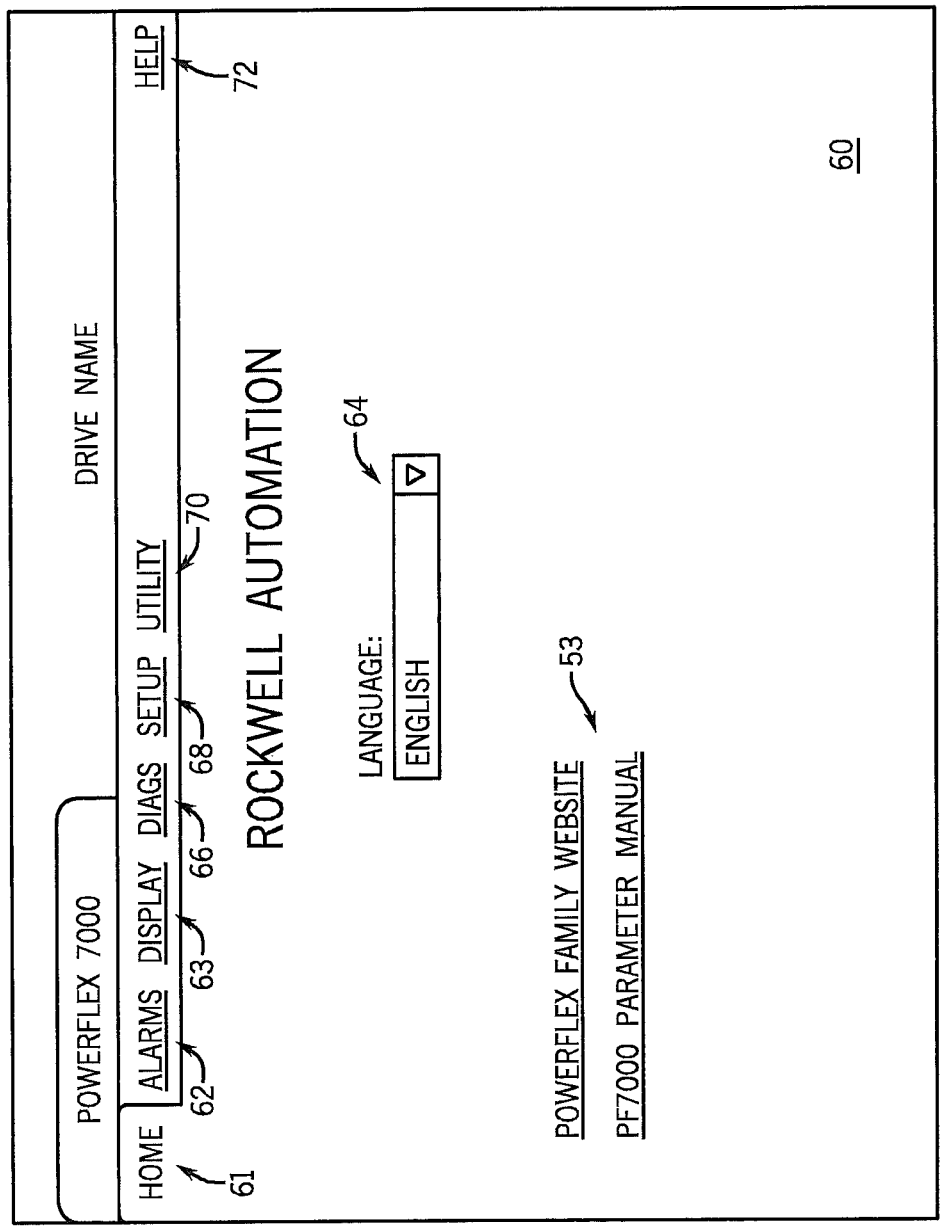

Referring in particular FIG. 3, in the present embodiment, when a browser program enters into communication with a drive system such as the drive system 2 of FIGS. 1A-1B by specifying an IP address 130, a first web page 132 is displayed that is associated with a filename index.html. The first web page 132 is a "Home Page" for the drive system and provides both first links 134 to documents internal to the drive and second links 136 to documents located externally elsewhere on the Internet. The web page 132 also provides a drop down list 138 of selectable programs or operations that the user can select from within the drive system. In the present embodiment, the programs that can be selected are a drive terminal program for either the .NET environment (".NET Terminal") or the Java environment ("JTerminal"), depending on the user's choice of hardware/software platform as a terminal. Further, additional selectable utilities that are available include one or more "Startup Wizards" for aiding in commissioning of the drive system, an "XIO Logix Editor" for programming, simple logic within the drive system, and a tool to configure the security features of the .NET Framework on the user's terminal/PC (".NET CodeGroup").

As noted above, the present exemplary FIGS. 3-8 presume that a Java environment is being used. To access the forms/dialogs provided in FIGS. 4-8, therefore, a user would select the "JTerminal" drive terminal program, at which time an additional page 60 shown in FIG. 4 would be brought up. As further shown by FIG. 4, the page 60 includes several selectable options that are listed across the top of the page. The selectable options, which take the form of selectable tabs 61, 62, 63, 66, 68, 70 and 72, relate to "Home", "Alarms", "Display", "Diagnostics", "Setup", "Utility" and "Help", respectively. When the page 60 first appears, the "Home" tab 61 appears to be selected. Such selection of the "Home" tab 61 results in the display of information and controls for establishing a hyperlink (or simply "link") to related drive material. For example, as shown, in the case where a PowerFlex drive manufactured by Rockwell Automation is being used, there are links 53 to a corresponding Online Parameter Manual or to the Rockwell PowerFlex website. The user's preferred language (e.g., English or Chinese) can also be selected from the page 60, by way of a drop-down menu 64.

Figure 5:
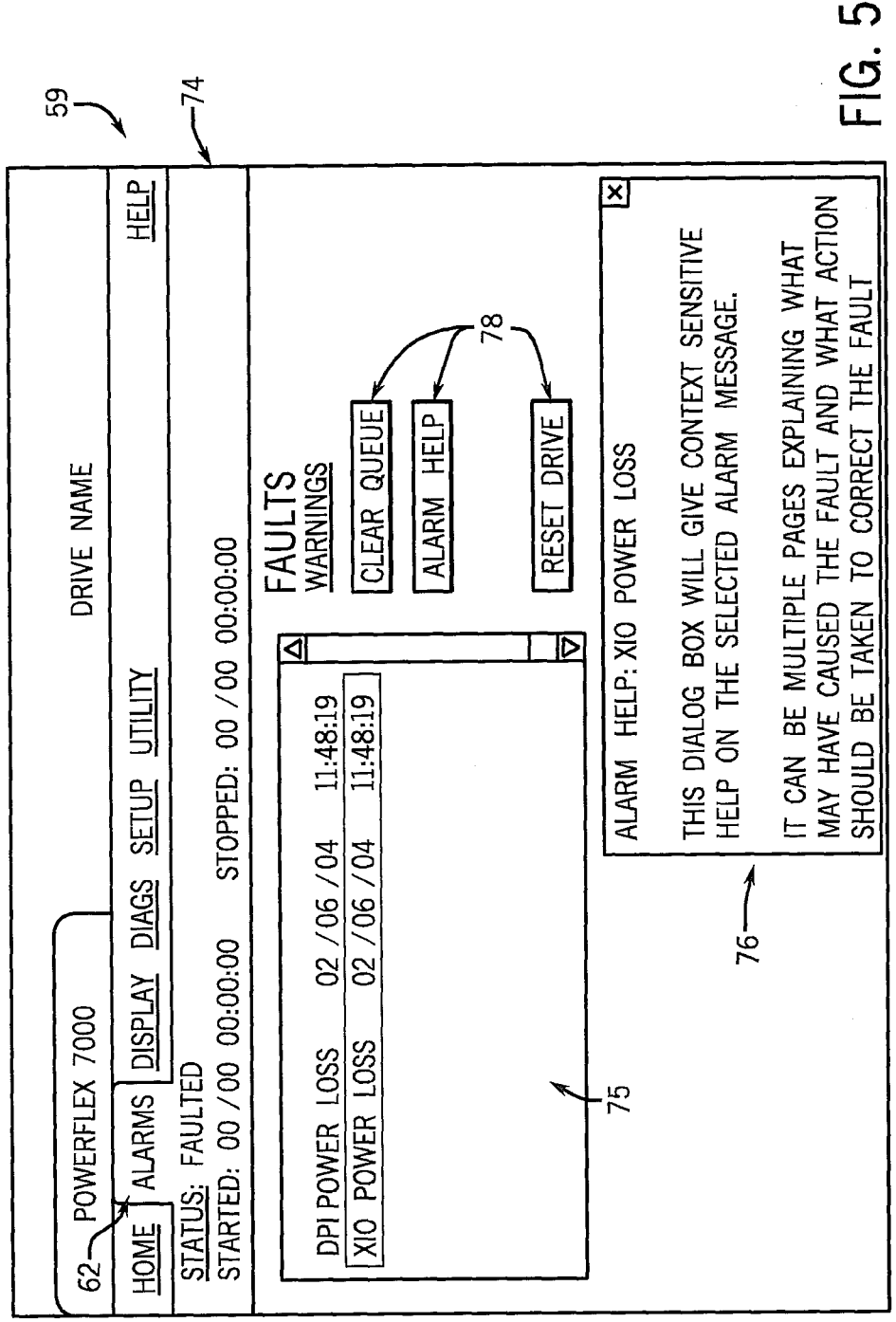

FIG. 5 in turn shows a web page 74 that appears when the tab 62 regarding Alarms is selected. As shown, the web page 74 is able to display in afield 75 any fault conditions that may have occurred with respect to the drive or the controlled motor(s)/machine(s). In the example shown, two fault conditions have occurred. Upon a user further selecting one of these faults (e.g., by "selecting" and "clicking" on the selected fault through the use of a mouse, or tapping the selection via a touch screen), additional information is provided in a pop-up form 76. In the example shown, the "XIO Power Loss" fault has been selected, and consequently additional information regarding that fault is displayed in the pop-up form 76. Additionally as shown, the web page 74 further includes several buttons 78 that allow a user to specify further actions or requests, namely, "Clear Queue", "Alarm Help", and "Reset Drive" buttons. In certain embodiments, the server module 14 of the drive system 2 can further be configured to automatically send one or more alert email messages to one or more email addresses when faults occur.

Figure 6:
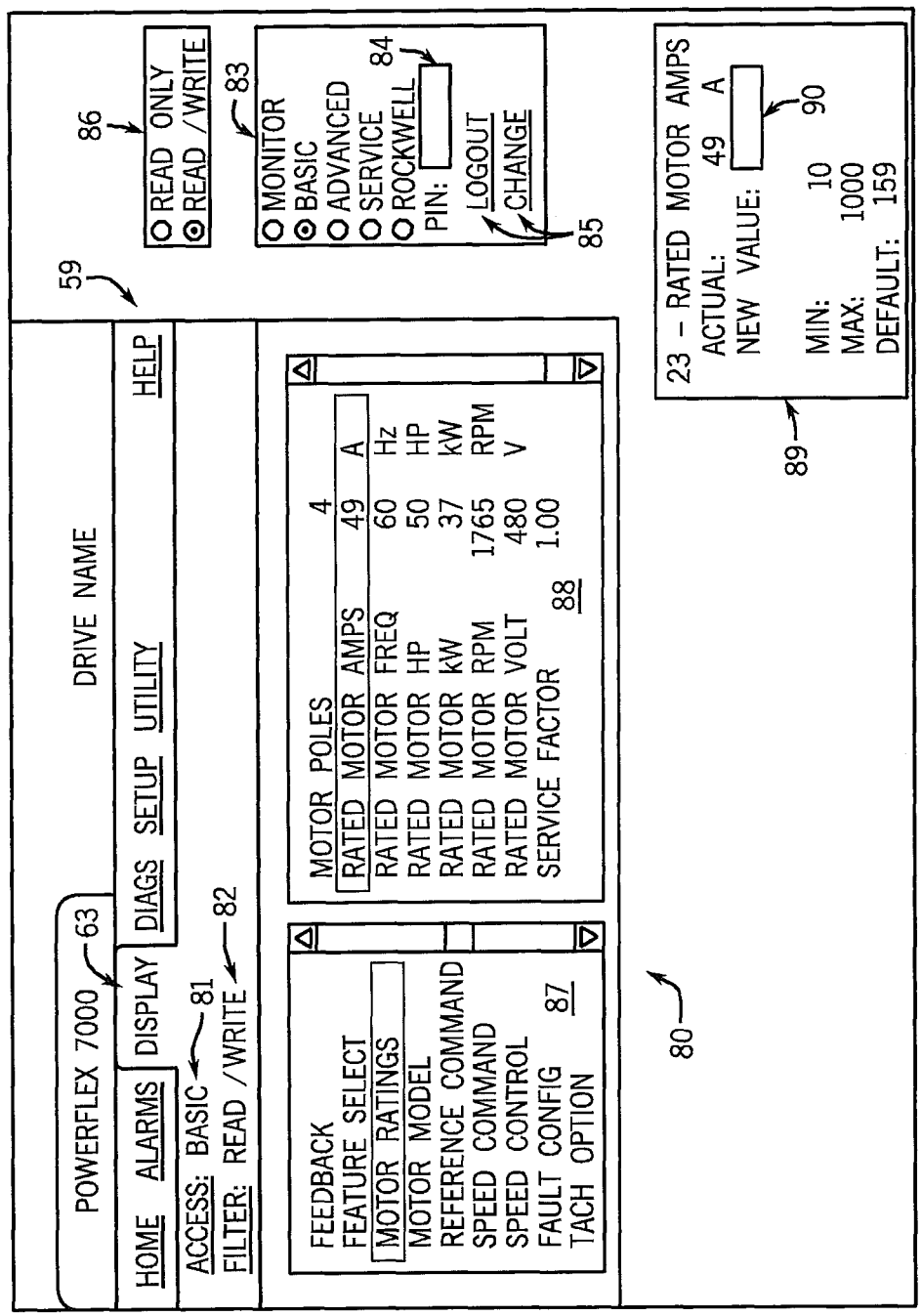

Referring to FIG. 6, an additional web page 80 appears when the tab 63 regarding Display is selected. As shown, in the present embodiment the web page 80 is able to display varying amounts of information depending upon an access level entered by the user. More particularly as shown, the web page 80 includes first and second selectable items 81 and 82 regarding "Access" and "Filter". Upon selecting the Access item 81, a pop-up form 83 appears from which the user can select an Access level from among five different levels ranging from "Monitor" to "Rockwell", each of which are protected by a PIN. If the user enters the correct PIN into the field 84, the selected level of access is granted. In the example shown the user has attempted to select, and has been allowed to select, the "Basic" level of access. Consequently, the web page 80 is configured to show information (and receive instructions) appropriate for that Basic level of access. The form 83 also has selectable items 85 allowing a user to logout from an access level or to change the PIN associated with an access level. In addition to the selectable item 81, the web page 80 also provides the selectable item 82 allowing a user to determine a Filter level. As shown, when the item 82 is selected, a pop-up form 86 appears allowing the user to specify whether the Filter level should be "Read Only" or "Read/Write".

Given a particular user-specified Access level and Filter level, the web page 80 then allows the display of certain corresponding amounts of information and also allows for (or restricts) the entry of certain types of requests/commands from the user. In the present example, given a Basic Access level and a Read/Write Filter level, a variety of information is displayed in a left field 87 of the web page 80. The information displayed in the left field 87 includes, as shown, a list of selectable parameter groups such as "Feedback", "Feature Select", "Motor Ratings" and several others (the particular parameter groups shown need not always be present, nor are exhaustive of all possible parameters; for example, in some alternate embodiments, the information displayed in the left field 87 could also include additional parameter groups such as "Control Masks", "Owners", "Logic I/O" and "Adapter I/O"). Upon receiving a user selection of one of these parameter groups, a second list of specified parameters corresponding to the selected parameter group appears in a right field. 88. In the example shown, the Motor Ratings parameter group was selected in the left field 87 and, consequently, a variety of specifiable motor parameters (e.g., "Motor Poles", "Rated Motor Amps", etc.) are shown in the right field 88, gene of the specifiable motor parameters is selected, then a further pop-up form 89 appears in which the user is presented with an opportunity to modify or specify a motor parameter. In the example shown, the "Rated Motor Amps" motor parameter has been selected from the right field 88, and consequently the pop-up form 89 provides d 90 in which the user could enter a new value for rated motor Amps.

Figure 7:
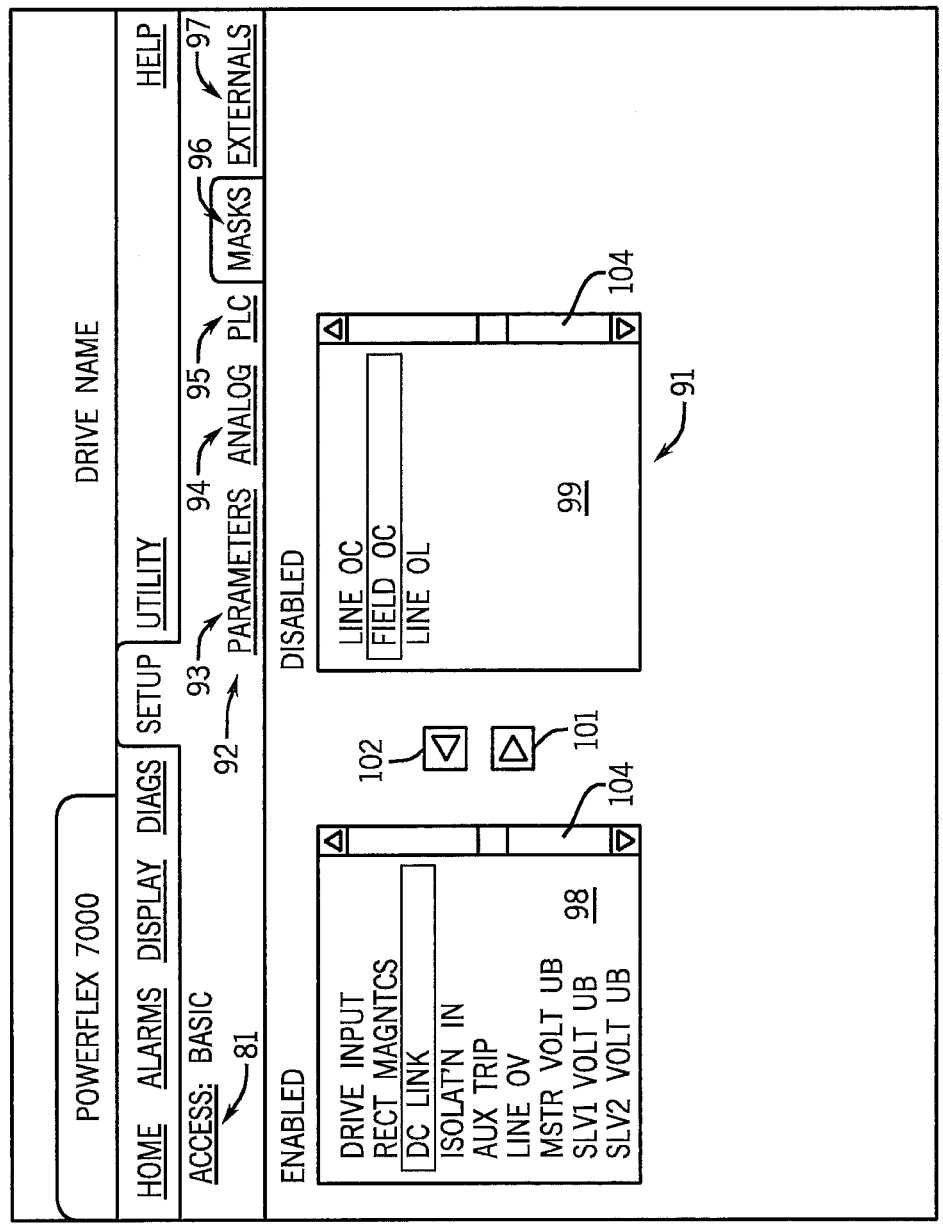
Figure 8:
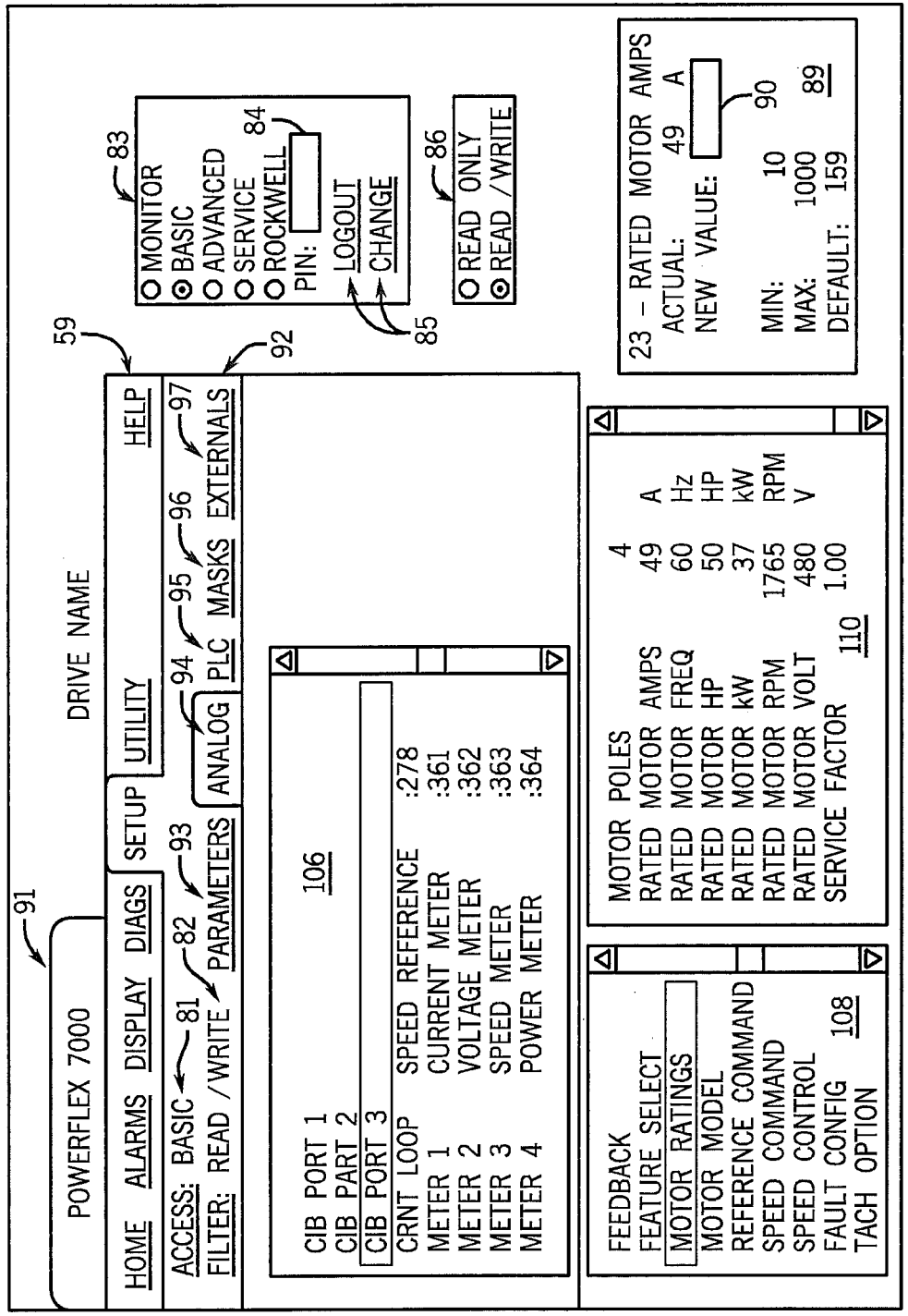

Turning to FIGS. 7 and 8, two images are provided of a further web page 91 that appears when the tab 68 regarding Setup is selected. As with respect to the web page 80 of FIG. 6, the web page 91 of FIGS. 7-8 includes the selectable items 81,82 that, when selected, allow a user to specify Access and Filter levels by way of the pop-up forms 83 and 86 (see FIG. 8 in particular; FIG. 7 only shows selectable item 81). As further shown, the web page 91 includes additional selectable options 92 including tabs 93, 94, 95, 96 and 97, namely, "Parameters", "Analog", "PLC", "Masks" and "Externals"

tabs, respectively. FIG. 7 in particular shows an image of the web page 91 when the Masks tab 96 is selected, while FIG. 8 shows an image of the web page 91 when the Analog tab 94 is selected. The selectable options 92 available on the web page 91 are options available to the user in terms of configuring the operation of, and the access to the drive/drive system (or drive module/drive control).

With respect to FIG. 7 in particular, when the Masks tab 96 is selected, left and right fields 98 and 99, respectively, appear in which various alarms (or, in alternate embodiments, various other characteristics) relating to the controlled motor 4 (or other machine(s)) or the drive system 2 are listed as being enabled or disabled, respectively. An enabled characteristic can be disabled by selecting that characteristic in the left field 98 and then clicking one right arrow button 101. Likewise, a disabled characteristic can be enabled by selecting that characteristic in the right field 99 and then clicking on a left arrow button 102. It is also possible to scroll through the lists of characteristics in the left and right fields 98, 99 by way of scroll bars 104. The various characteristics that can he enabled/disabled will vary depending upon the embodiment and circumstance. Exemplary characteristics include, as shown, a "Drive Input" characteristic, a "Line OC" characteristic, and numerous others.

FIG. 8 in contrast to FIG. 7 shows the web page 91 when the Analog tab 94 is selected. When this occurs, a field 106 appears within which are displayed various analog ports associated with the motor (or other controlled machine(s)) and/or the drive system that are being monitored/measured such as, for example, "Speed Reference" and "Current Meter". When one of the items listed in the field 106 is selected, then an additional pop-up form 108 appears listing parameter groupings which can be assigned to the selected port. In the example shown, when the item "CIB Port 3" is selected, all groups that contain parameters that can be assigned to the selected port are displayed in the pop-up form 108. Once one of the parameter groups within the pop-up form 108 is selected, then a further pop-up form 110 appears, showing the applicable parameters in the selected group, which can be assigned to the selected port. Only parameters that meet the Access 81 and Filter 82 properties/criteria are displayed. Additionally as in the example of FIG. 6, in the context of when the Parameters tab 93 was initially selected, when the "Rated Motor Amps" motor parameter is selected from the form 110, then the pop-up form 89 with field 90 appears, allowing the data entry of a new parameter value in the field 90.

This method of assigning a parameter to a port (including all of the selection operations) in the context of the Analog tab 94 is also employed in the context of the PLC tab 95. Further, the method of selecting a parameter for viewing or modification in the context of Parameters tab 93 is similar to that discussed with respect to the Display web page 80. In all cases, the Access 81 and Filter 82 properties limit the displayed information.

Figure 9:
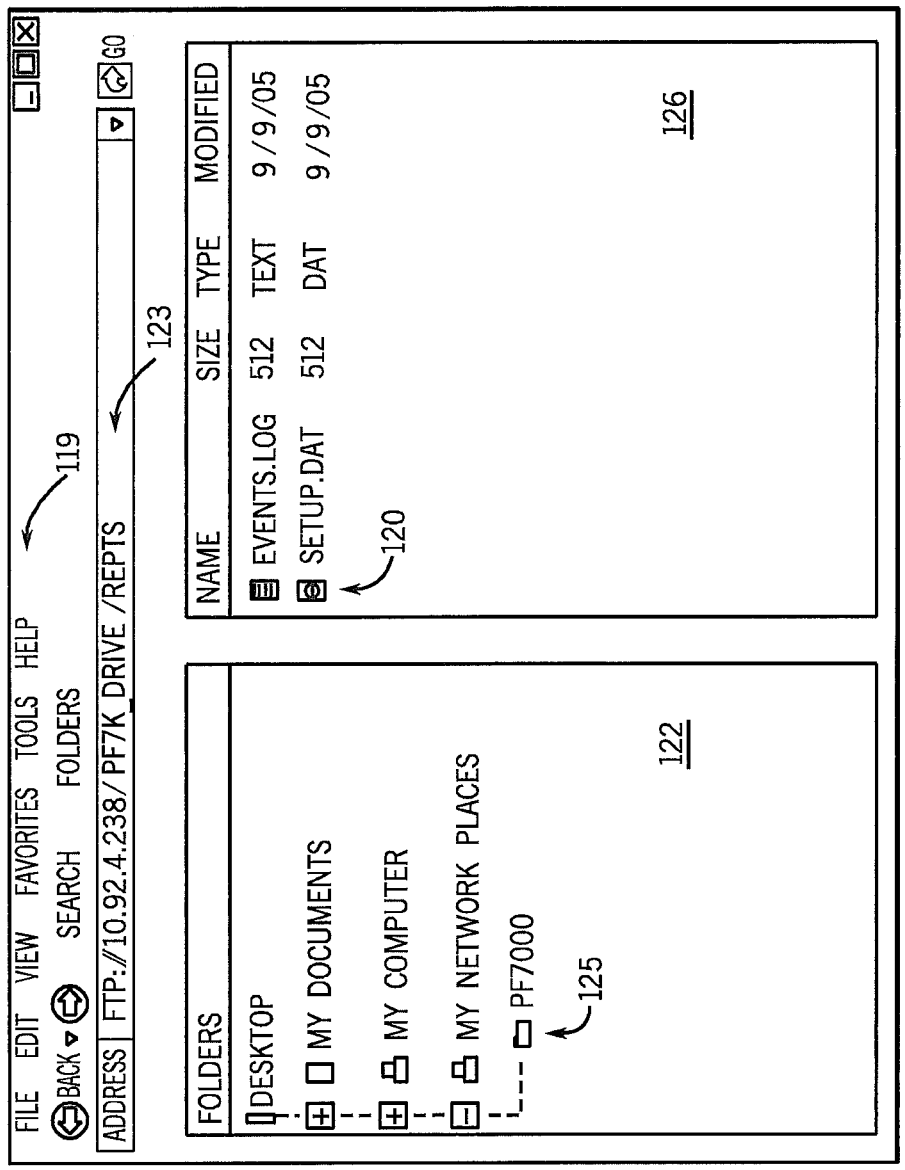

Turning to FIG. 9, as indicated, above, the drive system 2 (and in particular the server module 14) in at least some embodiments also has the capability of operating as an FTP server in order to transfer files between the drive system 2 (including the drive module 8) and the terminals such as the terminals 24, 26 coupled to the drive system. In at least one embodiment, such file transfers can be achieved as follows. As shown in FIG. 9, a user at one of the terminals 24, 26 can bring up a standard tool screen 121 such as File Explorer™ (in Windows XP™) or Internet Explorer™ (all of which are available from Microsoft Corporation), to view the file content provided by the server. Upon bringing up the standard tool screen 121, the user can enter into communication with the server module 14 by entering, into an address window 123, an appropriate IP address such as, for example, the FTP IP address and directory structure, FTP://10.92.4.238/PF7K_DRIVE/REPTS shown.

Once communication is established, first and second windows 122 and 126 are provided. In the first window 122, folders (or other memory locations) associated with the terminal (e.g., memory locations within the computer forming one the terminals 24, 26) are displayed while, in the second window 126, files that reside at the server module (or at some other portion of the drive system 2 such as the drive module 8) are displayed.

Once the first and second windows 122, 126 are displayed, the user can then cause the contents of a file listed in the second window 126 to be copied into a selected folder/memory location within the terminal simply by dragging and dropping the icon associated with that file (e.g., an icon 120 as shown) onto an appropriate folder icon (e.g., an icon 125) within the first window 122. Such a file transfer capability facilitates direct access to reports within the drive module and updating of firmware components. In at least some embodiments, a similar procedure could be followed also in terms of copying executable programs (or components of such programs) such as the executable programs 23 discussed above from the drive system 2 to one of the terminals 24, 26.

Also, it should be noted that, while embodiments of the present invention make it possible to communicate with a drive from a terminal using standard web browser program technology and tools such as Internet Explorer™ and File Explorer, various embodiments of the present invention also make it possible to facilitate industrial control protocols. For example, the server module 14 in at least some embodiments has a capability involving the Ethernet/IP protocol that allows for connection of the drive system 2 to existing proprietary software packages and tools (e.g., Drive Tools™ or Drive Explorer™ available from Rockwell Automation). Further in at least some embodiments, the server module 14 can be coupled to one or mere programmable logic controllers (PLCs) via PLC connections.

FIGS. 3-9 are intended to be exemplary of various webpages, windows, fields and other information that can be displayed to a user accessing a terminal such as one of the terminals 24, 26 of FIG. 1. As indicated by FIGS. 3-9, a wealth of information regarding the operation of a drive system connected to a motor (or other controlled machine or machines) such as the drive system 2 can be accessed by a user at one of the browser-equipped terminals. By way of interacting with the server module 14 via the terminals 24, 26, users can effectively "drill into" the server module and the drive module 8. Further, the amount or quality of information that is accessible can vary depending upon the situation, as well as upon a user's status or level of access, and also upon user-entered commands. Additionally, the browser-equipped terminals allow a user to provide numerous commands and instructions (or to provide other information) to the drive system 2 and, ultimately (if only indirectly), to the motor or other controlled machine or machines operated by the drive system 2.

The present invention is intended to encompass a variety of different drive systems that are equipped with a communications system that allows for communications with one or more outside terminals in a manner that does not require significant special configuration or tailoring of those outside terminals for interaction with the particular drive system.

Such a control system facilitates a variety of interactions with drives and their associated motor(s) (or other controlled machine(s)) that would otherwise be difficult or not possible. For example, such a control system makes it possible for a user to remotely control a drive system and/or an associated motor or other controlled machine(s), potentially from numerous locations (e.g., from numerous terminals around the world). Such control can include not only starting, stopping, or modifying the operation of a motor (e.g., increasing or decreasing its speed or torque) via the drive system, but also include providing configuration instructions to the drive system, such as instructions regarding what motor parameter should be monitored or modified (and or how to perform such monitoring/modification). In at least some embodiments, the present inventive system makes it possible to perform drive firmware configurations or upgrades via the established connection.

Further, such a user can also remotely monitor the drive system and/or associated motor or other machine(s), to allow for "remote diagnostics", "troubleshooting" and other operations. Numerous parameters can be monitored, which can relate to, for example (in the case of a motor), operating variables, drive configuration, motor ratings, motor and drive faults and/or related safe modes of operation, and coordination of one motor with another motor. Because such monitoring and control capabilities become available by virtue of the present invention, it also becomes possible for users to remotely control a given drive system or motor (or other controlled machine(s)) in relation to other drive systems or controlled machines, and to achieve coordinated control of multiple drive systems and/or controlled machines. Such monitoring and control capabilities are useful in a variety of industrial, commercial, residential, transportation-related and other environments.

The drive system control and/or monitoring capabilities afforded by various embodiments of the present invention can serve a variety of purposes. For example, in a development environment, a user may desire to program the drive system. Not only can embodiments of the present invention allow for such programming, but also at least some embodiments of the present invention allow a user to rapidly download new code for debugging, provide the user with access to extended trending, event logs and customized reporting (e.g., histograms), and allow a user to connect to multiple drives from the same development platform (e.g., from the same terminal/personal computer). Indeed, at least some embodiments of the present invention are particularly beneficial insofar as they allow any terminal/personal computer/workstation to access any drive that is connected to the network (such that point-to-point connections are not required), allow downloads to the drive to be performed at higher transfer rates than would otherwise be possible, and allow a user to accomplish tasks using familiar browser program technology and other familiar software programs (e.g., programs involving "drag and drop" features). The FTP server functionality described above with respect to FIG. 9 is particularly helpful this regard and allows, among other things, reports within a drive to be selected and opened using conventional software programs as if the report existed on the local bard drive of the terminal or on a local area network (LAN).

Embodiments of the present invention employing the browser-equipped terminals allow a user to both monitor the drive system and motor (or other machine) coupled thereto, as well as to perform diagnostics and order self-diagnostic tests/routines to be performed. Additionally, the browser-equipped terminals allow a user to control the setting up of each of the drive system and the motor (or other machine) coupled thereto, even possibly when the drive system and/or motor (or other machine) are first being manufactured. That is, embodiments of the present invention can be useful in setting up/configuring/testing the drive system and the motor (or other machine) coupled thereto, both in a "test bay" circumstance when the systems are first being manufactured, as well as in a "customer support" or "product support" circumstance after the system is already being operated in the field.

Further, due to the direct or full integration of the drive/drive module and server/server Module in at least some embodiments of the present invention, the introduction or upgrading of software, firmware or other aspects of both the drive and server can be performed in a coordinated manner, as a result of one action or procedure such as the introduction of a single software package. That is, in such embodiments, it is not necessary to conduct multiple, independent procedures to configure or upgrade the drive and server independently, but rather each of the drive and server (and, more particularly, each of their CPUs or other control devices, or their shared CPU or control device) can be configured or upgraded together in a single operation.

In a "test bay" circumstance, a 'payload' (e.g., firmware, language module, Drive Identity Module (DIM) data, XIOLogix program) for a particular job can be sent to a drive system such as the drive system 2 from a central server. The contents of the payload, which would typically be configured by technical personnel, allow each job to be customized without a need for manual loading in the test bay. For example, a particular job may require a different version of firmware from the standard version being shipped with other drives, due to functionality or compatibility with other systems. Only certain jobs receive a language module, which also differ depending on the country of destination. The DIM data which is already unique for each job can be downloaded directly to the drive and burnt into the DIM. Each of these operations relating to configuring the drive system with a payload, which conventionally might be done in a sequence of manual steps, can be automated using a single step. Different payloads can be automatically communicated to different drive systems simply by selecting a job number/item and downloading the respective payload to the respective drive. Further, incorporation of a payload into a given drive can also be followed with a set of predefined test bay parameters based on the motor setup required for the test bay dynes, again removing any manual entry requirements.

As for a "customer support" or "product support" circumstance, web-based embodiments of the present invention arc particularly advantageous insofar as a web based terminal not only ensures continual compatibility with new drive firmware (as the terminal firmware is part of the drive firmware), but allows remote connections to the drive using the same interface as if at the drive itself. A hardwired, distance limited connection no longer need be employed between the drive to the terminal, and individual proprietary software (with possible compatibility issues) running on a personal computer is not required. In addition, more then one terminal can be used. As a result, customers can easily place one or more terminals in a control room or remote site in addition to at the drive locally. When product support is required, customers or service personnel can each use the same familiar interface from their respective offices, even though the drive system is located at a remote site. Further, the FTP capability discussed with respect to FIG. 9 can be used by support personnel who are located remotely from the drive, in order to transfer firmware and/or enhance reporting capability.

Although many of the above-described embodiments involve the use of a "server" that is capable of sending web pages onto an internet-type communications medium, or capable of sending web pages in addition to other types of information (e.g., information following the FTP protocol or executable programs) onto an internet-type communications medium, the present invention is also intended to encompass other embodiments in which other types of communications media are employed. For example, in some embodiments, other types of media for communication in relation to other types of networks, (e.g., Token Ring networks, Firewire networks, USB-type networks, etc.,) can be utilized, where the servers are directly or fully integrated or otherwise associated with drives. Also, at least some embodiments of the present invention are envisioned in which the server only provides non-web page information such as information in accordance with the FTP protocol and/or executable programs. Thus, the present invention is not limited to embodiments that employ only a web server as a server.

Further, in the above discussion, a "drive system" or "drive" is understood to be a device that interacts with motors and/or other controlled devices that lack intelligence. For example, while a drive system will typically control the actual currents and/or voltages that are applied to the motor so as to govern the operational behavior of the motor (e.g., its frequency of operation), a drive system will not typically communicate in other manners with the motor (e.g., for configuring the motor or for data transmission). Nevertheless, the present invention is also intended to encompass alternate embodiments in which drive systems (or similar systems) are in communication with motors and/or other controlled devices that have some intelligence, e.g., devices that have a central processing unit, microprocessor, programmable logic device or other logic devices/components. In such embodiments, the communication between the drive systems and the controlled devices need not be limited to power signals, but also could include various other analog or digital communications signals, including possibly both high power and low power signals. In at least some such embodiments, it is possible on an external device such as one of the terminals 24, 26 to communicate with a motor (or other controlled device) directly or indirectly via the drive system, so as to configure, send commands to, receive data from, and/or otherwise communicate with the motor (or other controlled device).

Additionally, since drive systems in such embodiments are capable of communicating with motors and/or other controlled devices in various manners not limited merely to controlling the currents/voltages/power applied to the motors/controlled devices, the drive systems are capable of receiving, storing and/or processing the information received from the motors/controlled devices and also providing that information on to terminals such as the terminals 24, 26. Indeed, while conventional drive systems often operate "open loop" in relation to the motors or other devices being controlled, such that little if any feedback is received by the drive systems from the controlled devices, the present invention is intended to encompass "closed loop" arrangements in which the drive systems receive a variety of types of feedback from the motors, controlled devices or associated devices. Such feedback could range from minimal feedback, such as that provided by a tachometer associated with a motor, to a range of other signals that could potentially provide a variety of information to the drive system relating to performance, faults, configuration, and other characteristics of the motor or other controlled device.

It is specifically intended that the present invention not be limited to the embodiments and illustrations contained herein, but include modified forms of those embodiments including portions of the embodiments and combinations of elements of different embodiments as come within the scope of the following claims.

I claim:

1. A motor drive system, comprising:
a motor drive;
a drive module integrated with the motor drive;
drive control circuitry of the drive module configured to generate control signals during operation;
a plurality of power electronic switches of the motor drive configured to be switched in response to the control signals generated by the drive control circuitry to control application of power to an electric motor;
a communication port of the motor drive;
an add-on component configured to communicatively couple with the communication port of the motor drive, wherein the add-on component comprises a server module configured to communicate with the drive module via the communication port and to serve user-viewable pages to external network clients via a communication link.

2. The motor drive system of claim 1, wherein the user-viewable pages are stored on the motor drive and comprise data indicative of operation of the drive module.

3. The motor dive system of claim 1, wherein the communication link comprises an Ethernet link.

4. The motor drive system of claim 1, wherein the server module stores executable programs in the motor drive and enables execution of the executable programs by the external network clients.

5. The motor drive system of claim 4, wherein the server module enables at least one of the executable programs to be transferred to the motor drive from at least one of the external network clients.

6. The motor drive system of claim 1, comprising a user-access terminal communicatively coupled to the communication link.

7. The motor drive system of claim 6, wherein the user-access terminal comprises a browser configured to view the user-viewable pages.

8. The motor drive system of claim 1, wherein the server module comprises a PCMCIA card and a network port configured to couple with an internet-type communications medium to form the communication link.

9. The motor drive system of claim 1, wherein the drive module comprises one or more microprocessors configured to generate the control signals.

10. The motor drive system of claim 1, comprising the electric motor, wherein the electric motor comprises a medium voltage AC motor.

11. The motor drive system of claim 1, wherein the server module comprises a web server and stores or has access to a plurality of web pages that the sever module is configured to serve as the user-viewable pages.

12. A motor drive system, comprising:
a motor drive comprising a motor drive module;
drive control circuitry of the motor drive module configured to generate control signals;
a plurality of solid state switches of the motor drive that are switched via a pulse width modulated control regime in response to the control signals generated by the drive control circuitry to control current and voltage to an electric motor;

a communications port of the motor drive;

an add-on component configured to be communicatively coupled with the motor drive via the communications port of the motor drive; and a server module of the add-on component, wherein the server module is configured to communicate at least one user-viewable page to a remote terminal via a network communications medium.

13. The motor drive system of claim 12, wherein communicative coupling of the add-on component and the motor drive module enables components of the server module and the drive module to be configured or upgraded together in a single coordinated operation.

14. The motor drive system of claim 13, wherein the motor drive is configured for stand-alone operation for control of the electric motor.

15. The motor drive system of claim 13, comprising executable programs stored in the motor drive or the add-on component, wherein the server module is configured to enable execution of the executable programs by the remote terminal.

16. The motor drive system of claim 12, comprising a plurality of motor drives in communication with the server module via the network communications medium, wherein each of the plurality of motor drives is configured to control a separate electric motor.

17. A method of operating a motor drive, comprising:

controlling a plurality of solid state switches with control signals generated by drive control circuitry of a motor drive module to regulate current and voltage applied to an electric motor;

retaining an add-on component in communicative engagement with the motor drive via a communications port of the motor drive;

maintaining a user-viewable page in a memory of the motor drive or the add-on component; and serving the user-viewable page from a server module of the add-on component to a remote terminal via a network communications medium.

18. The method of claim 17, wherein serving the user-viewable page from the server module to the remote terminal comprises serving a webpage to a user access terminal with a browser, wherein the webpage comprises operational data from the motor drive module.

19. The method of claim 17, comprising receiving instructions from the remote terminal and executing an executable program on the motor drive or the server module based on the instructions.

20. The method of claim 17, comprising receiving an executable program from the remote terminal via the server module and storing the executable program on the motor drive.

* * * * *